US012405634B2

(12) United States Patent
An et al.

(10) Patent No.: US 12,405,634 B2
(45) Date of Patent: Sep. 2, 2025

(54) ANTENNA AND ELECTRONIC DEVICE INCLUDING SAME

(71) Applicant: Samsung Electronics Co., Ltd., Suwon-si (KR)

(72) Inventors: Seongyong An, Suwon-si (KR); Hyunsuk Kim, Suwon-si (KR); Kyungmoon Seol, Suwon-si (KR); Hojin Jung, Suwon-si (KR); Jaebong Chun, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 17/717,711

(22) Filed: Apr. 11, 2022

(65) Prior Publication Data

US 2022/0326738 A1    Oct. 13, 2022

Related U.S. Application Data

(63) Continuation of application No. PCT/KR2022/005121, filed on Apr. 8, 2022.

(30) Foreign Application Priority Data

Apr. 9, 2021   (KR) .................. 10-2021-0046533

(51) Int. Cl.
*G06F 1/16* (2006.01)
*H01Q 1/22* (2006.01)
(Continued)

(52) U.S. Cl.
CPC .......... *G06F 1/1658* (2013.01); *G06F 1/1641* (2013.01); *G06F 1/1652* (2013.01); (Continued)

(58) Field of Classification Search
CPC .... G06F 1/1658; G06F 1/1641; G06F 1/1652; G06F 1/1681; G06F 1/1615;
(Continued)

(56) References Cited

U.S. PATENT DOCUMENTS 9,071,673 B2    6/2015   Choi et al.
9,196,952 B2    11/2015  Tran et al.
(Continued)

FOREIGN PATENT DOCUMENTS

JP    2017-097345 A    6/2017
JP    2018-186488 A    11/2018
(Continued)

OTHER PUBLICATIONS

International Search Report dated Jul. 21, 2022, issued in International Application No. PCT/KR2022/005121.
(Continued)

*Primary Examiner* — Allen L Parker
*Assistant Examiner* — Keon Kim
(74) *Attorney, Agent, or Firm* — Jefferson IP Law, LLP

(57)   ABSTRACT

An electronic device is provided. The electronic device includes at least one hinge device, a plurality of housings that are foldably connected to each other via the at least one hinge device and configured to at least partially define a rolling space in a rolled state, a flexible display supported by the plurality of housings and disposed to be visible from the outside in the rolled state, a cavity defined to have a predetermined spatial volume through a conductive material in a first housing among the plurality of housings, wherein the cavity includes a slit that is at least partially connected to the outside, and a wireless communication circuit disposed in an inner space of at least one housing among the plurality of housings and electrically connected to a first point within the cavity, wherein the wireless communication (Continued)

circuit may be configured to form a radiation pattern through the cavity structure.

20 Claims, 18 Drawing Sheets

(51) Int. Cl.
*H01Q 1/38* (2006.01)
*H01Q 1/42* (2006.01)

(52) U.S. Cl.
CPC ......... *G06F 1/1681* (2013.01); *H01Q 1/2266* (2013.01); *H01Q 1/38* (2013.01); *H01Q 1/42* (2013.01)

(58) Field of Classification Search
CPC .... G06F 1/1679; G06F 1/1686; G06F 1/1698; H01Q 1/2266; H01Q 1/38; H01Q 1/42; H01Q 1/08; H01Q 1/24; H01Q 1/243
See application file for complete search history.

(56) References Cited

U.S. PATENT DOCUMENTS

| | | | |
|---|---|---|---|
| 10,243,624 B2 | 3/2019 | Kim et al. | |
| 10,498,041 B1 | 12/2019 | Lin et al. | |
| 10,629,982 B2 | 4/2020 | Kim et al. | |
| 2003/0030595 A1* | 2/2003 | Radley-Smith | G06F 1/163 345/1.3 |
| 2013/0058063 A1 | 3/2013 | O'Brien | |
| 2016/0044801 A1* | 2/2016 | Lee | H05K 7/1427 361/679.55 |
| 2017/0139442 A1 | 5/2017 | Yoshizumi | |
| 2017/0141820 A1* | 5/2017 | Kim | H04M 1/0266 |
| 2019/0013584 A1* | 1/2019 | Ryu | H01Q 21/0006 |
| 2019/0237847 A1* | 8/2019 | Wu | H01Q 9/42 |
| 2019/0311692 A1 | 10/2019 | Shai | |
| 2020/0076062 A1* | 3/2020 | Lee | H04M 1/0268 |
| 2020/0245481 A1* | 7/2020 | Yoon | G06F 1/1652 |
| 2021/0075459 A1 | 3/2021 | Noh et al. | |
| 2021/0219437 A1 | 7/2021 | Kim et al. | |
| 2021/0344783 A1 | 11/2021 | Jeong et al. | |

FOREIGN PATENT DOCUMENTS

| | | | | |
|---|---|---|---|---|
| JP | 6505582 B2 | 4/2019 | | |
| KR | 20170056246 A | * | 5/2017 | .......... H01Q 1/2266 |
| KR | 10-2019-0077107 A | 7/2019 | | |
| KR | 10-2019-0143029 A | 12/2019 | | |
| KR | 10-2020-0024500 A | 3/2020 | | |
| KR | 10-2021-0031309 A | 3/2021 | | |

OTHER PUBLICATIONS

Extended European Search Report dated May 21, 2024, issued in European Application No. 22785017.9-1201.
Korean Office Action dated Jun. 18, 2025, issued in Korean Application No. 10-2021-0046533.

* cited by examiner

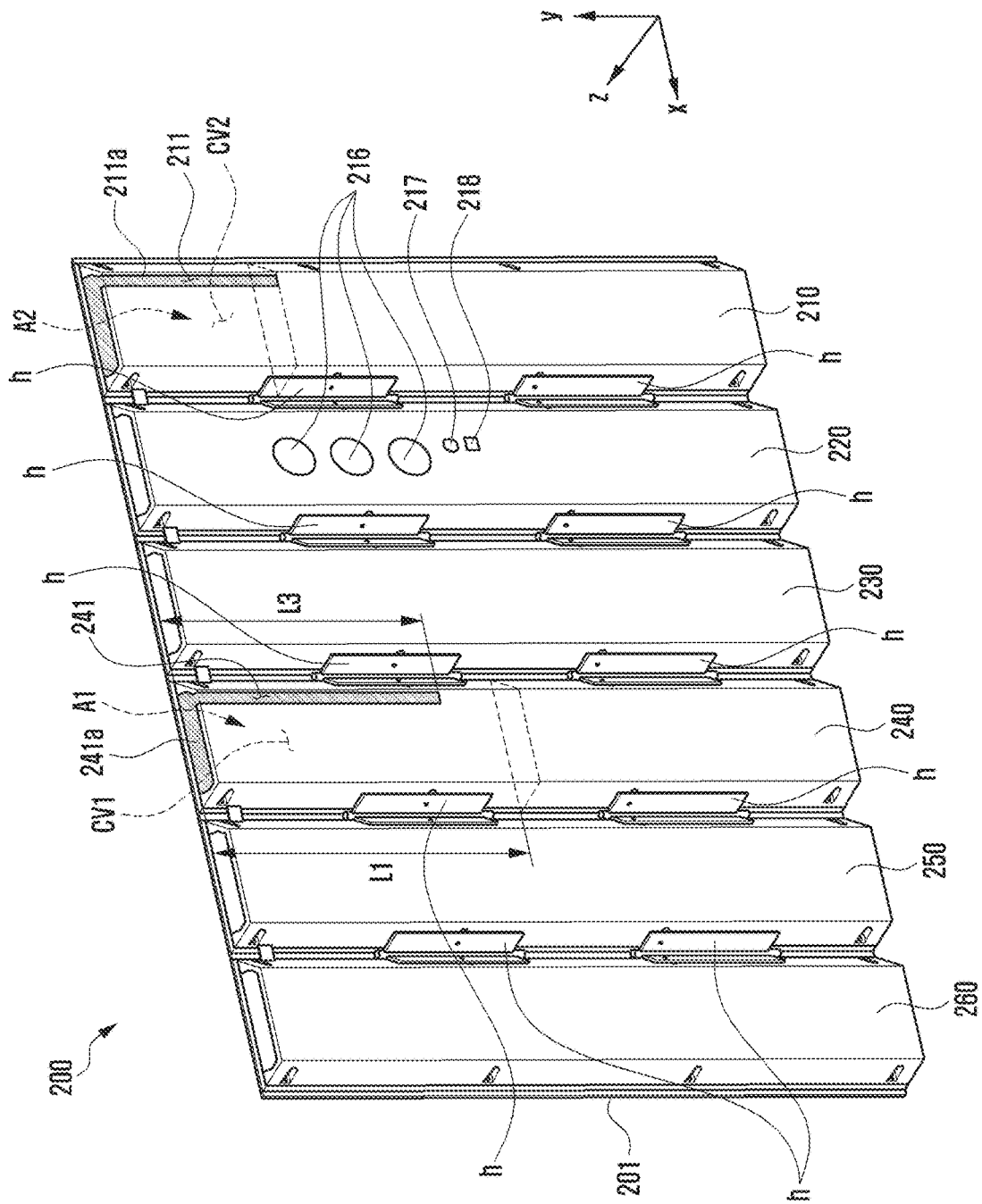

ANTENNA AND ELECTRONIC DEVICE INCLUDING SAME

CROSS-REFERENCE TO RELATED APPLICATION(S)

This application is a continuation application, claiming priority under § 365(c), of an International application No. PCT/KR2022/005121, filed on Apr. 8, 2022, which is based on and claims the benefit of a Korean patent application number 10-2021-0046533, filed on Apr. 9, 2021, in the Korean Intellectual Property Office, the disclosure of which is incorporated by reference herein in its entirety.

TECHNICAL FIELD

The disclosure relates to an electronic device including an antenna. More particularly, the disclosure relates to an electronic device including a plurality of housings foldably coupled to each other via hinge devices and a foldable flexible display disposed to be supported by the plurality of housings.

BACKGROUND ART

Electronic devices are being gradually slimmed, and are being developed to increase rigidity, to enhance a design aspect, and to differentiate functional elements thereof. Electronic devices are gradually changing from a uniform rectangular shape to various shapes. An electronic device may have a deformable structure that makes it easy to carry the electronic device and enables a large screen display to be used. For example, as a type of a deformable structure, an electronic device may have an operating structure (e.g., a rollable structure or a rolling structure) capable of implementing various display forms of a flexible display through support of a plurality of housings that are foldably coupled to each other. Such an electronic device may include an antenna.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device may include a plurality of housings foldably coupled to each other via hinge devices and a foldable flexible display disposed to be supported by the plurality of housings. When the electronic device is in a flat state, the plurality of housings are capable of supporting the flexible display to cause the flexible display to be deformed into a usable flat state. When the electronic device is in a rolled state, the plurality of housings are capable of being folded relative to each other to have a rolling space in the inside thereof and to cause the flexible display to be rolled. In this case, the housings define the rolling space so as to face each other, and the flexible display may be deformed to be visible from the outside while being supported by the housings.

Meanwhile, the plurality of housings may be at least partially made of a conductive material to reinforce rigidity of the electronic device. The electronic device may include at least one antenna disposed in at least one housing among the plurality of housings. In the flat state, the at least one antenna may form a radiation pattern in a rearward direction in which the housings are oriented.

However, in the rolled state of the electronic device in which the plurality of housings are deformed to face each other, the radiation pattern formed from at least one antenna may be degraded in radiation performance compared to that in the flat state due to peripheral housings made of a conductive material.

Aspects of the disclosure are to address at least the above-mentioned problems and/or disadvantages and to provide at least the advantages described below. Accordingly, an aspect of the disclosure is to provide an antenna capable of exhibiting a predetermined radiation performance regardless of a deformation operation of the electronic device and an electronic device including the same.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes at least one hinge device, a plurality of housings that are foldably connected to each other via the at least one hinge device and configured to at least partially define a rolling space in a rolled state, a flexible display supported by the plurality of housings and disposed to be visible from the outside in the rolled state, a cavity defined to have a predetermined spatial volume through a conductive material in a first housing among the plurality of housings, wherein the cavity includes a slit that is at least partially connected to the outside, and a wireless communication circuit disposed in an inner space of at least one housing among the plurality of housings and electrically connected to a first point within the cavity, wherein the wireless communication circuit may be configured to form a radiation pattern through the cavity structure.

Advantageous Effects of Invention

The electronic device according to various embodiments of the disclosure includes an antenna having a radiation pattern formed through a feeding structure inside the cavity so that the predetermined radiation performance of an antenna can be ensured in the flat state and the rolled state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 10A is a perspective view of an electronic device illustrating an arrangement structure of slits with respect to cavities according to an embodiment of the disclosure;

Throughout the drawings, like reference numerals will be understood to refer to like parts, components, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
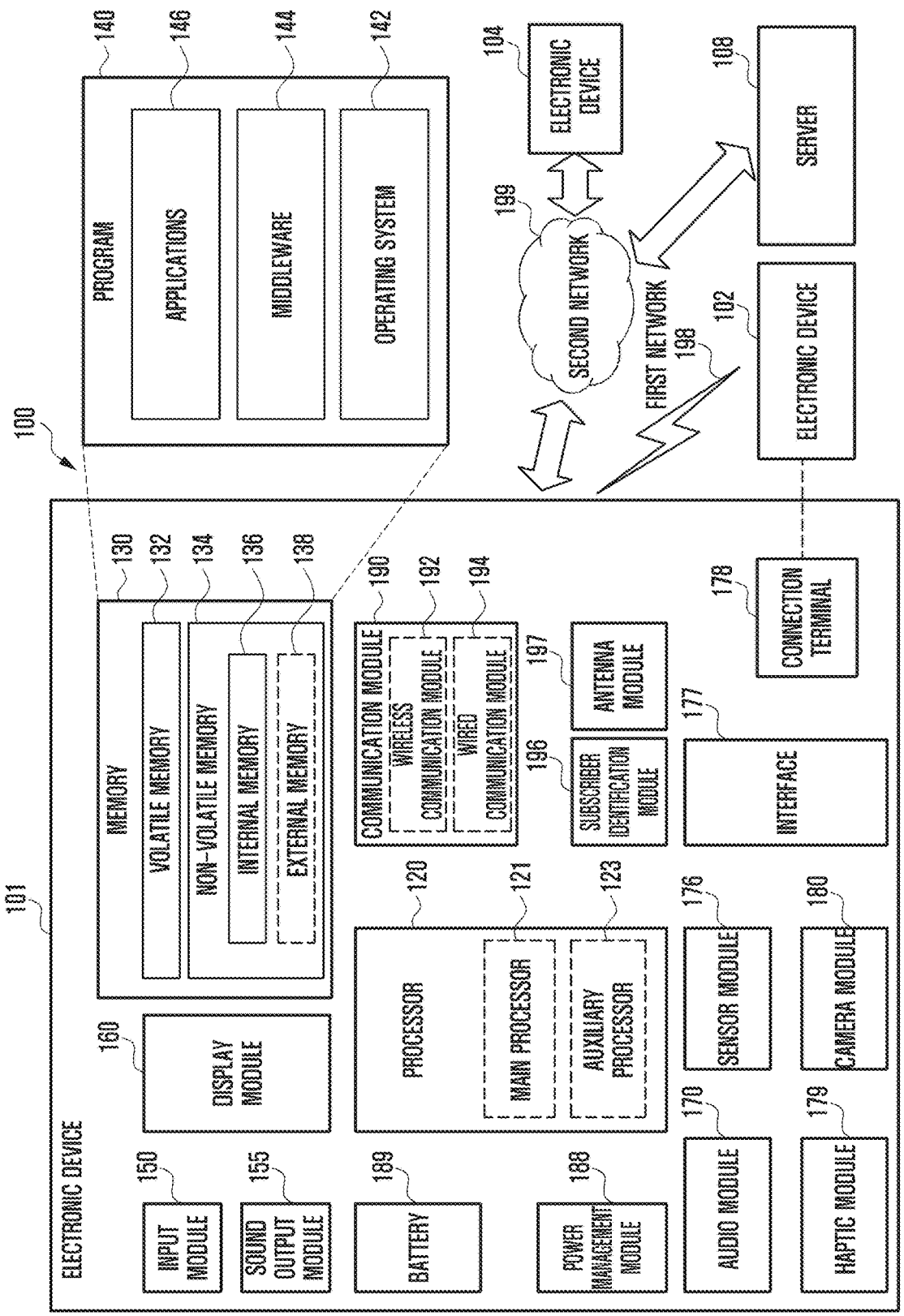
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, a memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments of the disclosure, at least one (e.g., the display device 160 or the camera module 180) of the components may be omitted from the electronic device 101, or one or more other components may be added in the electronic device 101. In various embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134, which includes an internal memory 136 and an external memory 138. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
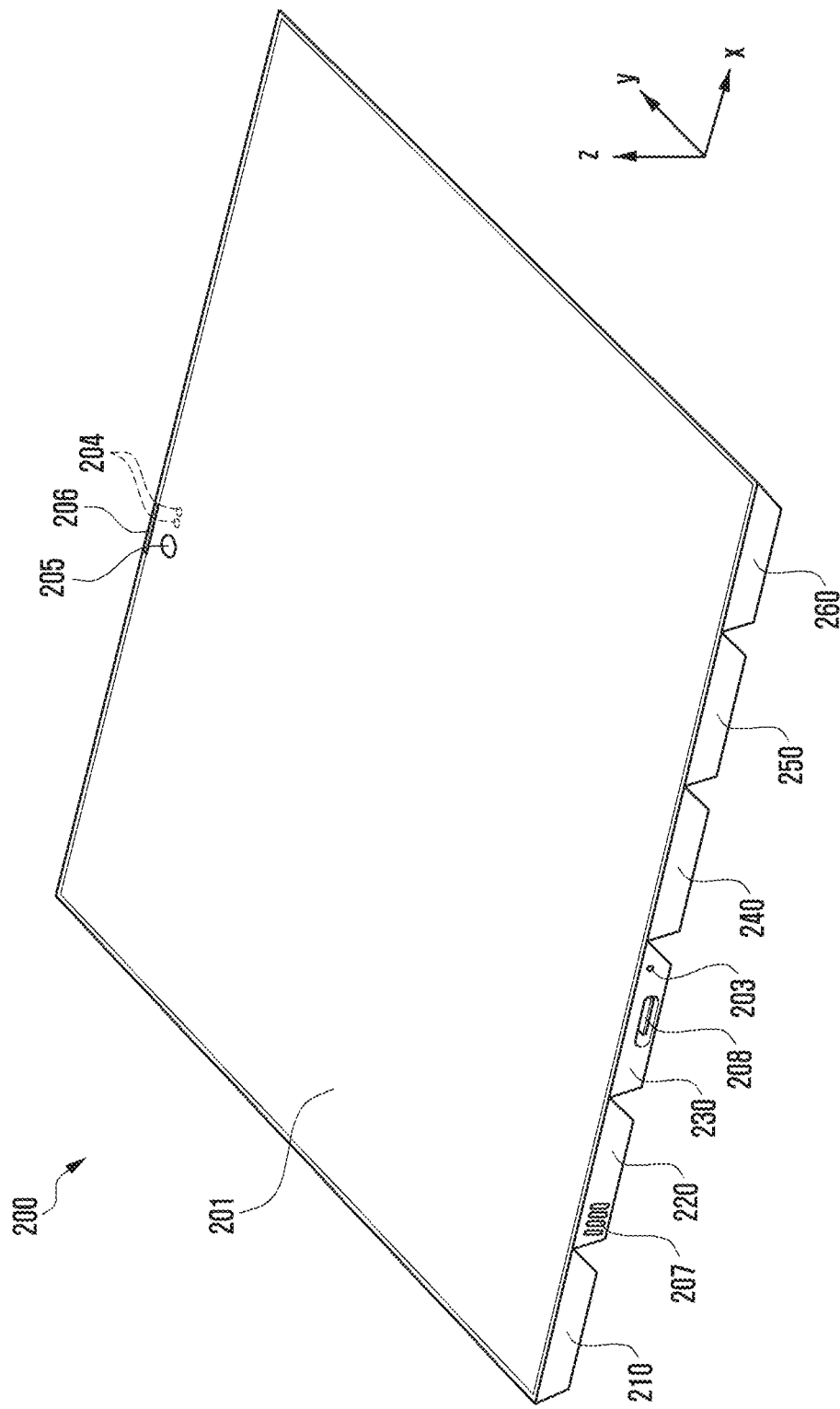
FIGS. 2A and 2B are front and rear perspective views illustrating an electronic device in a flat state according to various embodiments of the disclosure.
Figure 2B:
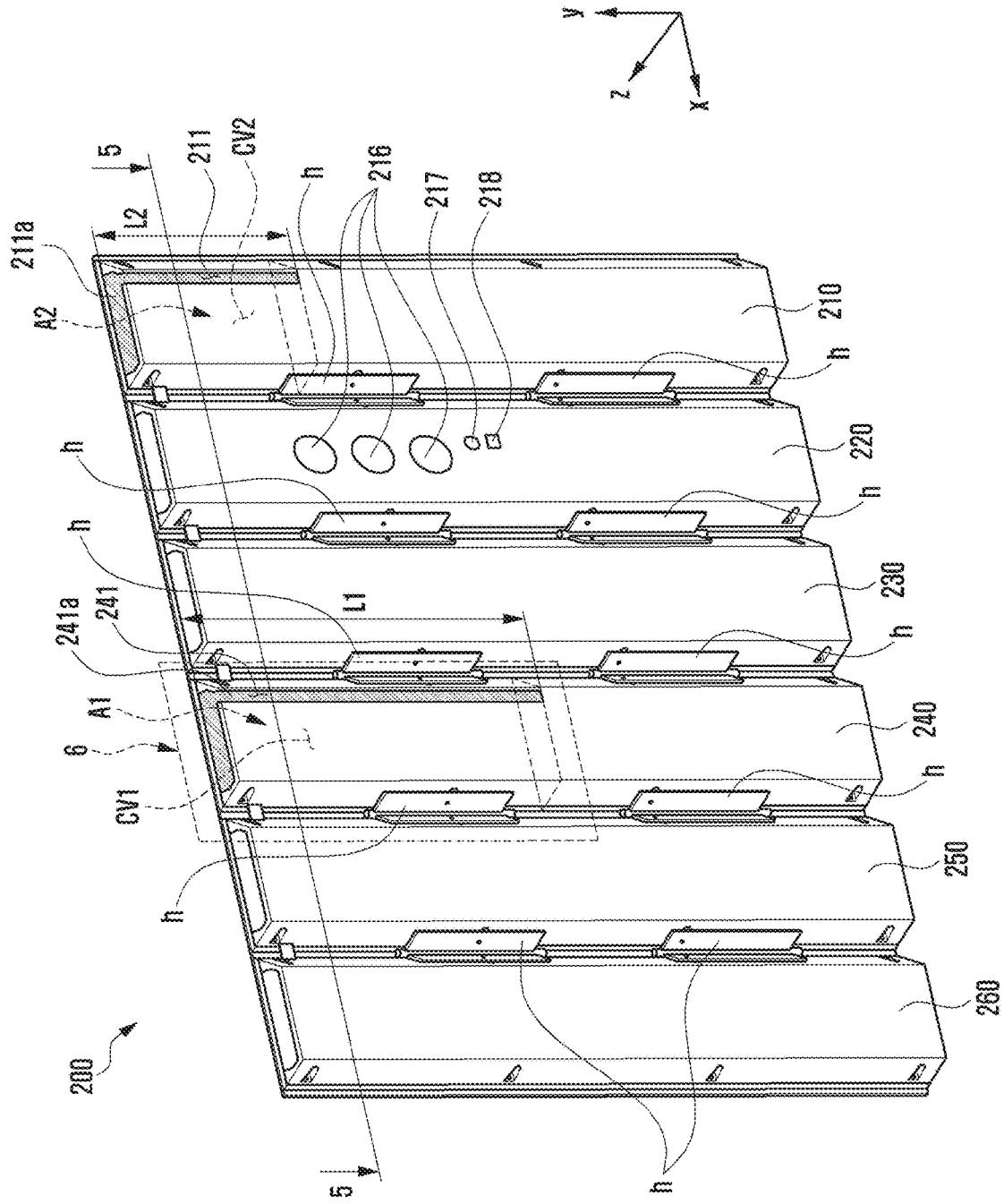
Figure 3A:
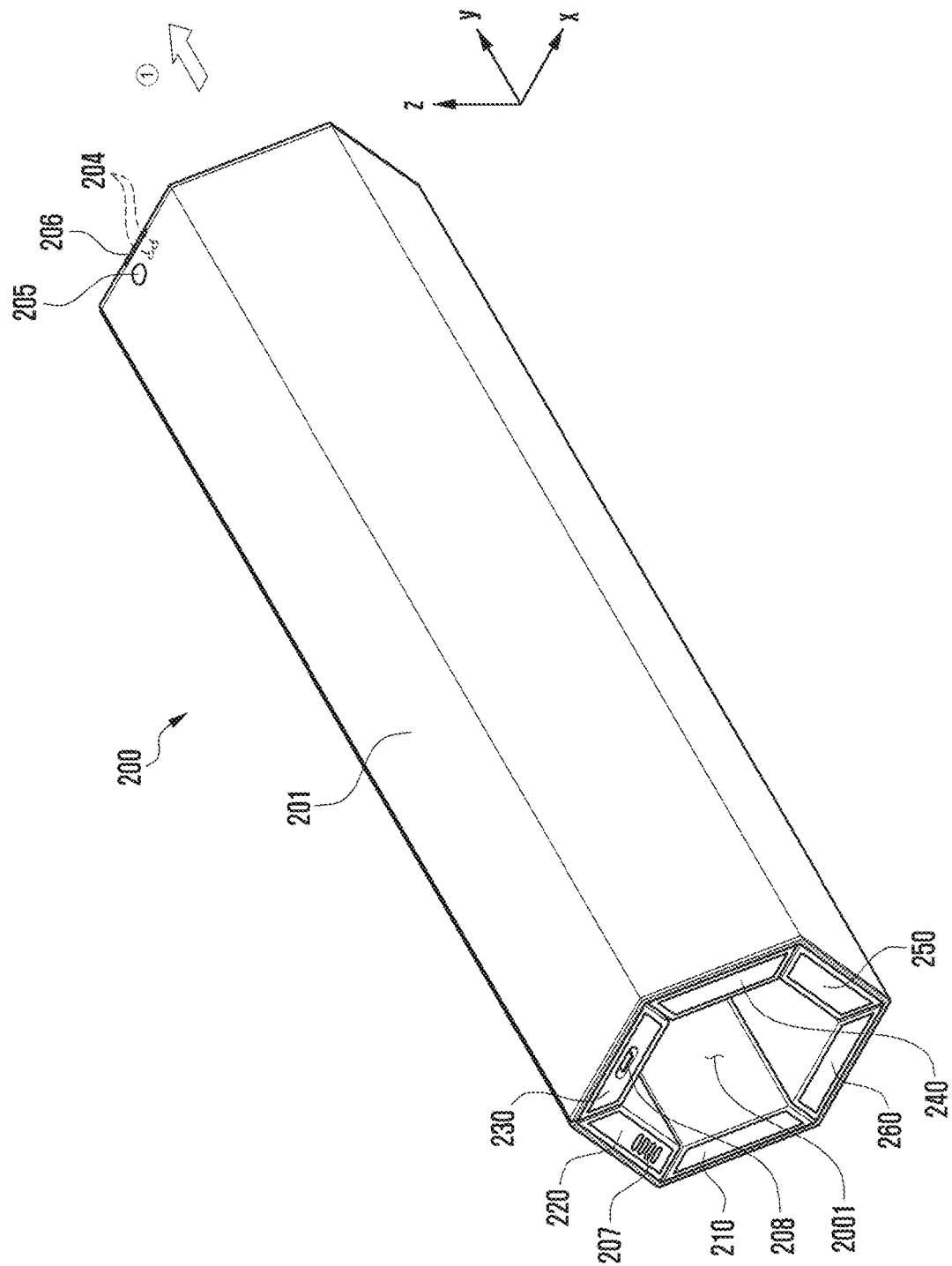
FIG. 3A is a perspective view illustrating an electronic device in a rolled state according to an embodiment of the disclosure.

FIGS. 2A and 2B are front and rear perspective views illustrating an electronic device in a flat state according to various embodiments of the disclosure. FIG. 3A is a perspective view illustrating an electronic device in a rolled state according to an embodiment of the disclosure.

An electronic device 200 of FIGS. 2A to 3A may be at least partially similar to the electronic device 101 of FIG. 1 or may further include other embodiments of the electronic device.

Referring to FIGS. 2A, 2B, and 3A, the electronic device 200 may include a plurality of housings 210, 220, 230, 240, 250, and 260 foldably coupled to each other via at least one hinge device h and a flexible display 201 supported via the plurality of housings 210, 220, 230, 240, 250, and 260. According to an embodiment of the disclosure, the plurality of housings 210, 220, 230, 240, 250, and 260 may include a first housing 210, a second housing 220, and a third housing 230, a fourth housing 240, a fifth housing 250, and/or a sixth housing 260, which are connected to each other via hinge devices h. The electronic device 200 according to various embodiments of the disclosure is not limited to the number of housings 210, 220, 230, 240, 250, and 260, and various numbers of housings may be coupled to each other as necessary. According to an embodiment of the disclosure, the plurality of housings 210, 220, 230, 240, 250, and 260 may be at least partially made of a metal material. According to an embodiment of the disclosure, in the flat state, the electronic device 200 may be deformed to define a substantially flat plane and may support the flexible display 201 via the flat plane, thereby providing a larger display region. According to an embodiment of the disclosure, when the electronic device 200 is in the rolled state (e.g., a rolling state), the plurality of housings 210, 220, 230, 240, 250, and 260 may be folded at a predetermined angle, thereby being deformed to form a hollow rolling space 2001 as a whole. According to an embodiment of the disclosure, in the rolled state, the plurality of housings 210, 220, 230, 240, 250, and 260 may be folded such that the first housing 210 and the sixth housing 260 come into contact with each other. In this case, the flexible display 201 may be deformed according to the folding operation of the plurality of housings 210, 220, 230, 240, 250, and 260 and may be curved in the manner of being rolled along the plurality of housings 210, 220, 230, 240, 250, and 260. According to an embodiment of the disclosure, in the rolled state, the flexible display 201 may be disposed to be partially visible from the outside in various directions in the outside.

According to various embodiments of the disclosure, the electronic device 200 may include at least one of at least one input device 203, at least one sound output device 206 or 207, at least one sensor module 204 or 217 or 218, at least one camera module 205 or 216, a connector port 208, or a key input device (not illustrated). In another embodiment of the disclosure, the electronic device 200 may be configured such that at least one of the above-mentioned components is omitted or other components (e.g., an indicator) are additionally included. According to an embodiment of the disclosure, the plurality of housings 210, 220, 230, 240, 250, and 260 are at least partially have of inner spaces (e.g., inner spaces 2101, 2201, 2301, 2401, 2501, and 2601 in FIG. 5), respectively. According to an embodiment of the disclosure, the above-described components may be disposed in the inner spaces of at least some of the plurality of housings 210, 220, 230, 240, 250, and 260.

Figure 5:
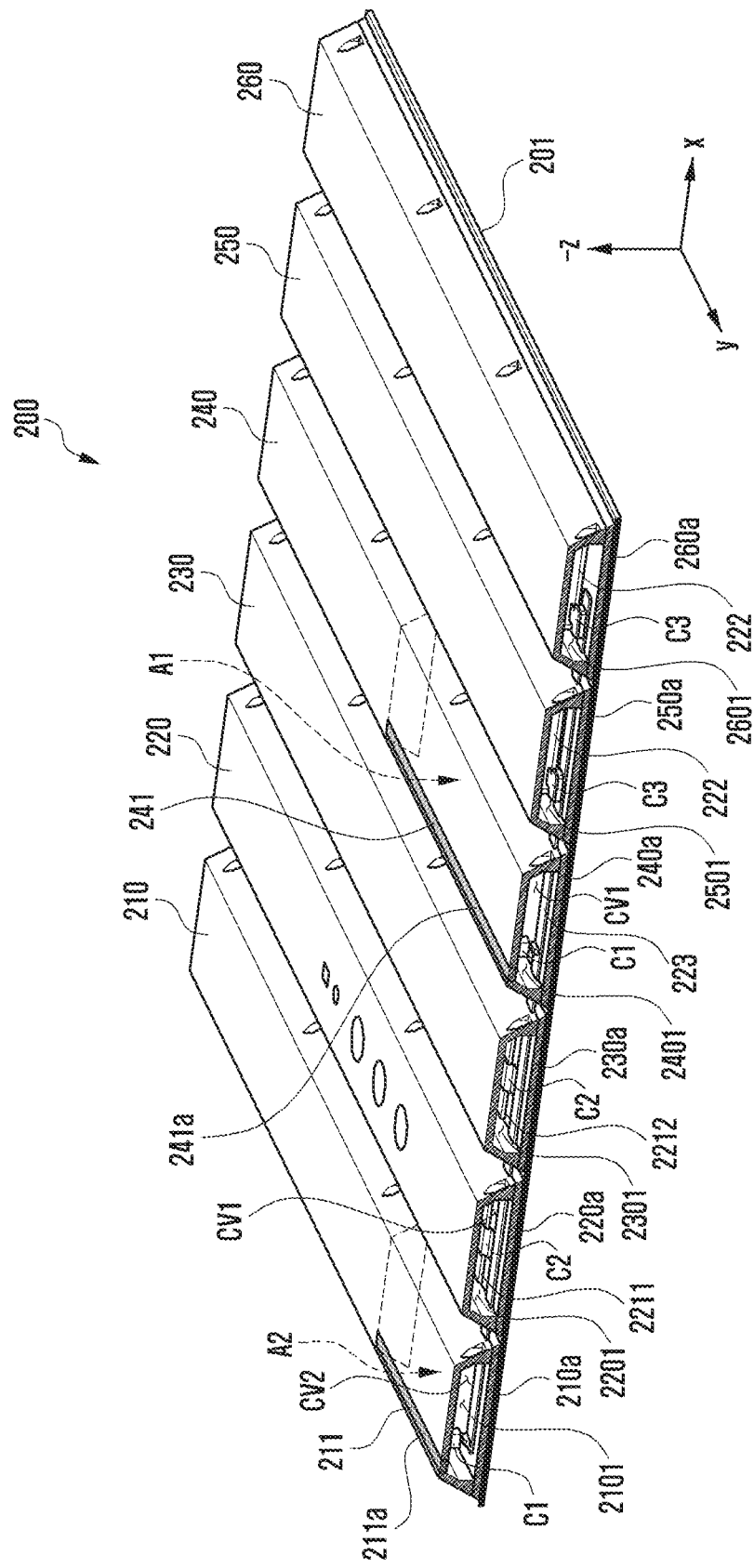
FIG. 5 is a cut-away perspective view of an electronic device taken along line 5-5 in FIG. 2B according to an embodiment of the disclosure.

According to various embodiments of the disclosure, the input device 203, the at least one sound output device 206 or 207, the at least one sensor module 204 or 217, the connector port 208, or the at least one camera module 205 or 216 may be disposed through a third space of a third housing 230 (e.g., the third space 2301 in FIG. 5) and/or a second space of a second housing 220 (e.g., the second space 2201 in FIG. 5). According to an embodiment of the disclosure, the above-described components may be disposed in other housings among the plurality of housings 210, 220, 230, 240, 250, and 260. In some embodiments of the disclosure, the electronic device 200 may be configured such that at least one of the above-mentioned components is omitted or other components are additionally included.

According to various embodiments of the disclosure, the input device 203 may include a microphone. In some embodiments of the disclosure, the input device 203 may include a plurality of microphones arranged to detect the direction of sound. According to an embodiment of the disclosure, the at least one sound output device 206 or 207 may include a speaker. According to an embodiment of the disclosure, the at least one sound output device 206 or 207 may include a receiver 206 disposed in the third housing 230 and an external speaker 207 disposed in the second housing 220. According to an embodiment of the disclosure, the connector port 208 may face the outside through a connector port hole provided in the third housing 230. In some embodiments of the disclosure, the sound output device 206 may include a speaker that is operated without a separate speaker hole (e.g., a piezo speaker). According to an embodiment of the disclosure, the at least one sensor module 204 or 217 may include a first sensor module 204 disposed to detect an external environment through the third housing 230 and a second sensor module 217 disposed to detect the external environment via the second housing 220. According to an embodiment of the disclosure, the at least one sensor module 204 or 217 may generate an electrical signal or a data value corresponding to the internal operating state of the electronic device 200 or the external environmental state. According to an embodiment of the disclosure, the first sensor module 204 may include a proximity sensor or an illuminance sensor. According to an embodiment of the disclosure, the second sensor module 217 may include a heart rate monitoring (HRM) sensor. According to an embodiment of the disclosure, the first sensor module 204 may be disposed under the flexible display 201 in the third space of the third housing 230 (e.g., the third space 2301 in FIG. 5) and may detect the external environment through the flexible display 201. According to an embodiment of the disclosure, the second sensor module 217 may be disposed in the second space of the second housing 220 (e.g., the second space 2201 in FIG. 5) and may detect the external environment through at least a portion of the second housing 220. According to an embodiment of the disclosure, the at least one sensor module 204 or 217 may further include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments of the disclosure, the electronic device 200 may include at least one antenna A1 or A2. According to an embodiment of the disclosure, the at least one antenna A1 or A2 may include a first antenna A1 disposed through a first cavity CV1 (e.g., at least a portion of the fourth space 2401 in FIG. 5) sealed and defined to have a predetermined first spatial volume in the fourth housing 240 made of a conductive material, and/or a second antenna A2 disposed through a second cavity CV2 (e.g., at least a portion of the first space 2101 in FIG. 5) sealed and defined to have a predetermined second spatial volume smaller than the first spatial volume in the first housing 210 made of a conductive material. According to an embodiment of the disclosure, the first cavity CV1 may be provided through a conductive material and a first slit 241 having a predetermined shape and coupled to the conductive material. For example, the first slit 241 may have a first length L1 corresponding to the first cavity CV1. In some embodiments of the disclosure, the first length L1 of the first slit 241 may be different from that of the first cavity CV1. In this case, the first length L1 of the first slit 241 may be determined depending on the operating frequency band of the first antenna A1. According to an embodiment of the disclosure, the second cavity CV2 may be provided through a conductive material and a second non-conductive portion coupled to the conductive material and having a predetermined shape. For example, a second slit 211 may have a second length L2 corresponding to the second cavity CV2. In some embodiments of the disclosure, the second length L2 of the second slit 211 may be different from that of the second cavity CV2. In this case, the second length L2 of the second slit 211 may be determined depending on the operating frequency band of the second antenna A2. According to an embodiment of the disclosure, the first slit 241 and/or the second slit 211 may be filled with a non-conductive materials 241a and 211a coupled to the conductive material through injection molding.

According to various embodiments of the disclosure, the electronic device 200 may include wireless communication circuit (e.g., the wireless communication module 192 in FIG. 1) disposed in at least one housing among the plurality of housings 210, 220, 230, 240, 250, and 260. According to an embodiment of the disclosure, the wireless communication circuit (e.g., the wireless communication module 192 in FIG. 1) may be electrically connected to a predetermined position within the first cavity CV1 in the fourth housing 240 via an electrical connection member (e.g., the electrical connection member 223 in FIG. 5). According to an embodiment of the disclosure, the wireless communication circuit (e.g., the wireless communication module 192 in FIG. 1) may be electrically connected to a predetermined position within the second cavity CV2 in the first housing 210 via an electrical connection member (e.g., the electrical connection member 223 in FIG. 5). According to an embodiment of the disclosure, the first antenna A1 may be configured to transmit and/or receive a radio signal in a first frequency band via the wireless communication circuit (e.g., the wireless communication module 192 in FIG. 1) electrically connected to the first cavity CV1. According to an embodiment of the disclosure, the second antenna A2 may be configured to transmit and/or receive a radio signal in a second frequency band higher than the first frequency band via the wireless communication circuit (e.g., the wireless communication module 192 in FIG. 1) electrically connected to the second cavity CV2. According to an embodiment of the disclosure, the first frequency band and/or the second frequency band may include a frequency band in the range of 800 MHz to 6,000 MHz. According to an embodiment of the disclosure, the first frequency band may include a high frequency band (e.g., 2.3 GHz to 2.7 GHz). According to an embodiment of the disclosure, the second frequency band may include an n77 (e.g., 3.3 GHz to 4.2 GHz) band. In some embodiments of the disclosure, the first antenna A1 and/or the second antenna A2 may be disposed in at least one housing among the other housings 220, 230, 250, and 260.

The at least one antenna A1 or A2 according to various embodiments of the disclosure forms a field in the inside of a cavity via a feed structure within the cavity CV1 or CV2), and may thus be relatively less influenced by peripheral conductors. Accordingly, when the electronic device is in the rolled state, even if the peripheral housings 220, 230, 250, and 260 are close to the fourth housing 240 and/or the first housing 210, the radiation pattern of the first antenna A1 and/or the second antenna A2 is formed in a direction in which the hollow rolling space 2001 faces the outside (e.g., in direction ① direction) (e.g., the y-axis direction) so that degradation in radiation performance can be reduced.

Figure 3B:
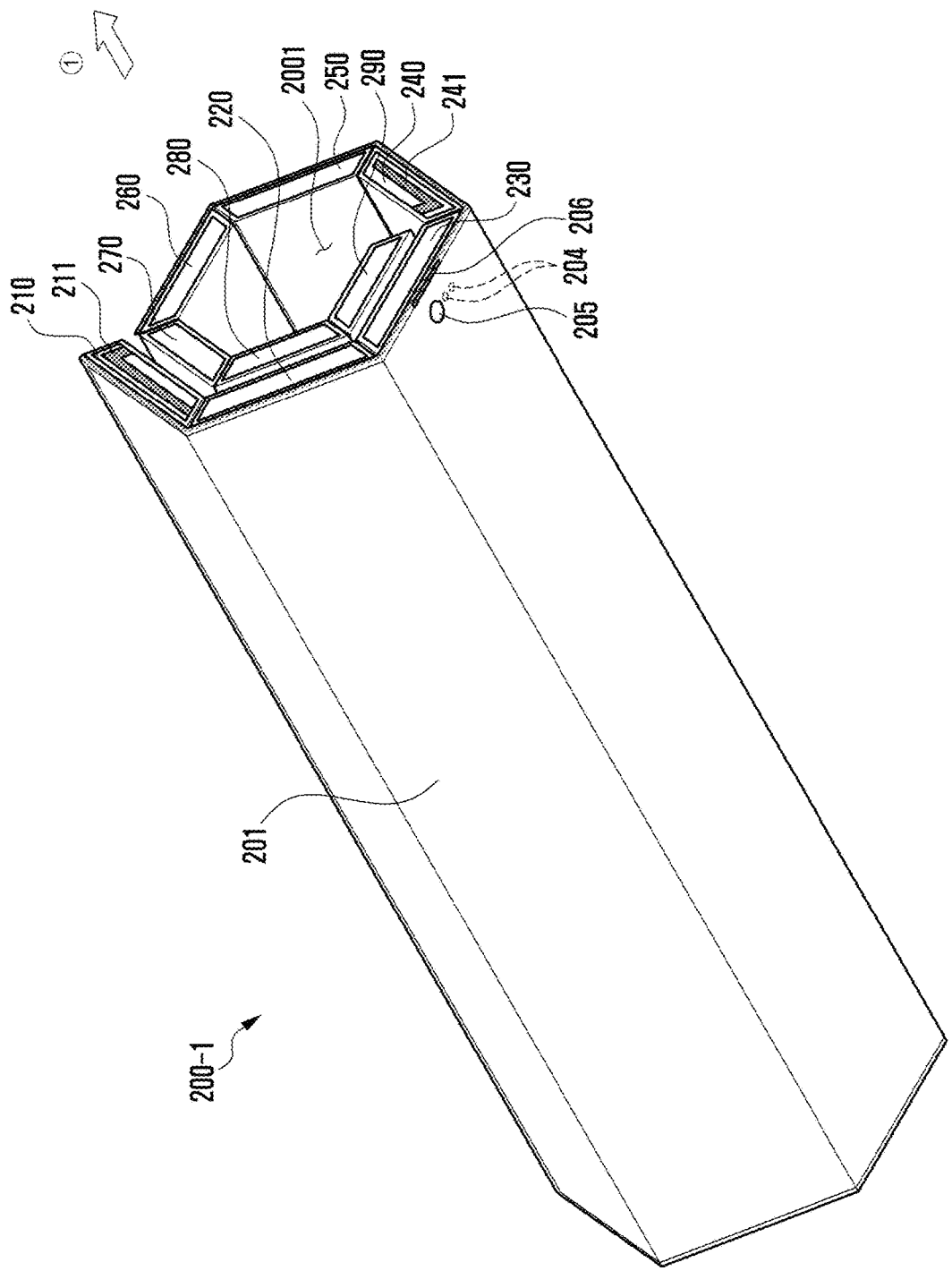
FIG. 3B is a perspective view illustrating an electronic device in a rolled state according to an embodiment of the disclosure.

FIG. 3B is a perspective view illustrating an electronic device in the rolled state according to an embodiment of the disclosure.

In describing the electronic device 200-1 of FIG. 3B, the same components as those of the electronic device 200 of FIG. 3A are denoted by the same reference numerals, and a detailed description thereof may be omitted.

Referring to FIG. 3B, compared to the electronic device 200 of FIG. 3A, the electronic device 200-1 may further include a seventh housing 270, an eighth housing 280, and/or a ninth housing 290, which may be sequentially coupled to each other via hinge devices h to be foldable relative to each other. In this case, when the electronic device 200-1 is in the rolled state, at least some of the plurality of housings 210, 220, 230, 240, 250, 260, 270, 280, and 290 may be deformed to overlap each other. For example, in the rolled state, the electronic device 200-1 may be deformed such that the first housing 210 overlaps the seventh housing 270, the second housing 220 overlaps the eighth housing 280, and the third housing 230 overlaps the ninth housing 290. In this case, in the electronic device 200-1, a radiation pattern may be formed in a direction in which the hollow rolling space 2001 faces the outside (e.g., direction ①) (e.g., the y-axis direction) via a first antenna A1 and a second antenna A2 disposed in at least one housing 240 or 210 among the plurality of housings 210, 220, 230, 240, 250, 260, 270, 280, and 290.

Figure 4:
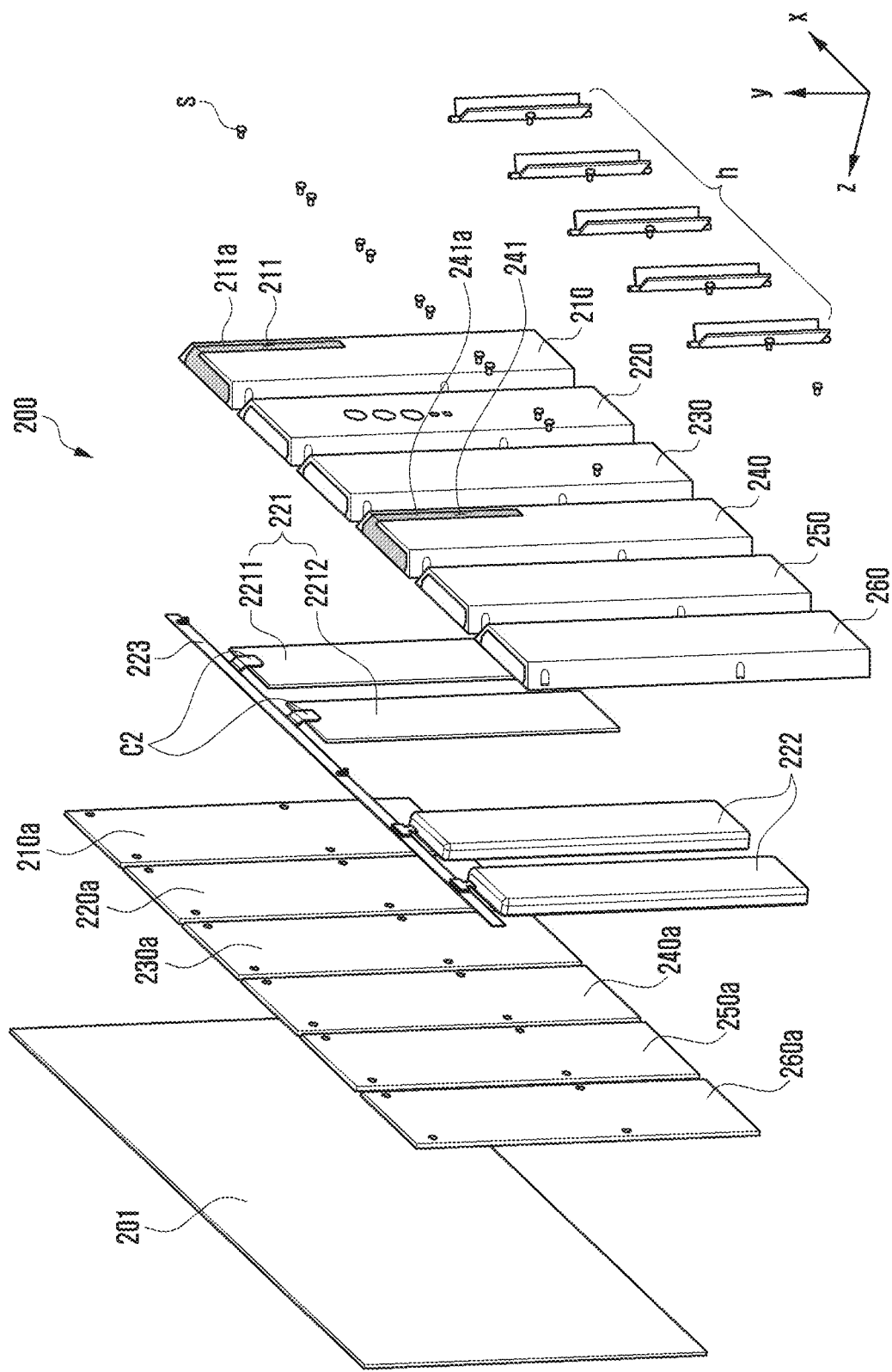
FIG. 4 is an exploded perspective view of an electronic device according to an embodiment of the disclosure.

FIG. 4 is an exploded perspective view of an electronic device according to an embodiment of the disclosure. FIG. 5 is a cut-away perspective view of an electronic device taken along line 5-5 in FIG. 2B according to an embodiment of the disclosure.

Referring to FIGS. 4 and 5, the electronic device 200 may include a plurality of housings 210, 220, 230, 240, 250, and 260 foldably coupled to each other via at least one hinge device h and a flexible display 201 supported via the plurality of housings 210, 220, 230, 240, 250, and 260. According to an embodiment of the disclosure, the plurality of housings 210, 220, 230, 240, 250, and 260 may include a first housing 210, a second housing 220, and a third housing 230, a fourth housing 240, a fifth housing 250, and a sixth housing 260, which are connected to each other via hinge devices h. According to an embodiment of the disclosure, each of the plurality of housings 210, 220, 230, 240, 250, and 260 may define a space sealed by being coupled with corresponding one of a plurality of conductive support members 210a, 220a, 230a, 240a, 250a, and 260a. According to an embodiment of the disclosure, each of the plurality of housings 210, 220, 230, 240, 250, and 260 may be coupled with a corresponding one of the plurality of support members 210a, 220a, 230a, 240a, 250a, and 260a via fastening members, such as screws S. For example, the first housing 210 may define a first space 2101 (e.g., the second cavity CV2) by being coupled with a first support member 210a. The second housing 220 may define a second space 2201 by being coupled with a second support member 220a. The third housing 230 may define a third space 2301 by being coupled with a third support member 230a. The fourth housing 240 may define a fourth space 2401 (e.g., the first cavity CV1) by being coupled with a fourth support member 240a. The fifth housing 250 may define a fifth space 2501 by being coupled with a fifth support member 250a. The sixth housing 260 may define a sixth space 2601 by being coupled with a sixth support member 260a. According to an embodiment of the disclosure, the plurality of housings 210, 220, 230, 240, 250, and 260 may define a substantially flat plane for supporting the flexible display 201 via the support members 210a, 220a, 230a, 240a, 250a, and 260a.

According to various embodiments of the disclosure, the electronic device may include at least one substrate 221 and at least one battery 222 disposed in the inner spaces of at least some of the plurality of housings 210, 220, 230, 240, 250, and 260, and a bendable electrical connection member 223 disposed to cross the inner spaces of the plurality of housings 210, 220, 230, 240, 250, and 260. According to an embodiment of the disclosure, the electrical connection member 223 may include a flexible printed circuit board (FPCB) or a coaxial cable. According to an embodiment of the disclosure, the at least one substrate 221 may include a first substrate 2211 disposed in the second space 2201 of the second housing 220 and/or a second substrate 2212 disposed in the third space 2301 of the third housing 230. According to an embodiment of the disclosure, the at least one battery 222 may be disposed in each of the fifth space 2501 of the fifth housing 250 and/or the sixth space 2601 of the sixth housing 260. In some embodiments of the disclosure, batteries may be disposed in one housing or in three or more different housings. According to an embodiment of the disclosure, the first substrate 2211 and the second substrate 2212 may be electrically connected to the electrical connection member 223, which crosses the second space 2201 of the second housing 220 and the third space 2301 of the third housing 230, via a substrate connector C2. According to an embodiment of the disclosure, the at least one battery 222 may be electrically connected to the electrical connection member 223, which crosses the fifth space 2501 of the fifth housing 250 and the sixth space 2601 of the sixth housing 260, via a battery connector C3. Accordingly, even when one or more batteries 222 are disposed in different housings, respectively, the batteries 222 may be electrically connected to the at least one substrate 221 via the electrical connection member 223.

According to various embodiments of the disclosure, the electronic device 200 may include a first antenna A1 configured through the first cavity V1 defined in at least a portion of the fourth space 2401 of the fourth housing 240 and a second antenna A2 configured through the second cavity CV2 defined by at least a portion of the first space 2101 of the first housing 210. According to an embodiment of the disclosure, the fourth space 2401 and the first cavity CV1 may be substantially the same. According to an embodiment of the disclosure, the first space 2101 and the second cavity CV2 may be substantially the same. According to an embodiment of the disclosure, the fourth housing 240 may include a first slit 241 disposed to have substantially the same length as the first cavity CV1 in the longitudinal direction (the y-axis direction) of the first cavity CV1 at a position corresponding to the first cavity CV1. According to an embodiment of the disclosure, the first housing 210 may include a second slit 211 disposed to have substantially the same length as the second cavity CV2 in the longitudinal direction (the y-axis direction) of the second cavity CV2 at a position corresponding to the second cavity CV2. According to an embodiment of the disclosure, the first cavity CV1 may be electrically connected to the electrical connection member 223, which crosses the first cavity CV1, via an antenna connector C1. According to an embodiment of the disclosure, the second cavity CV2 may be electrically connected to the electrical connection member 223, which crosses the second cavity CV2, via the antenna connector C1. Accordingly, the first point in the first cavity CV1 and the second point in the second cavity CV2 may be electrically connected to at least one substrate 221 including the wireless communication circuit (e.g., the wireless communication module 192 in FIG. 1) via the electrical connection member 223. In some embodiments of the disclosure, the at least one substrate 221 and/or the at least one battery 222 may be disposed in the same housing. According to an embodiment of the disclosure, the connectors C1, C2, and C3 may include at least one of a C-clip, a conductive tape, a pogo pin, or a conductive sponge.

Figure 6:
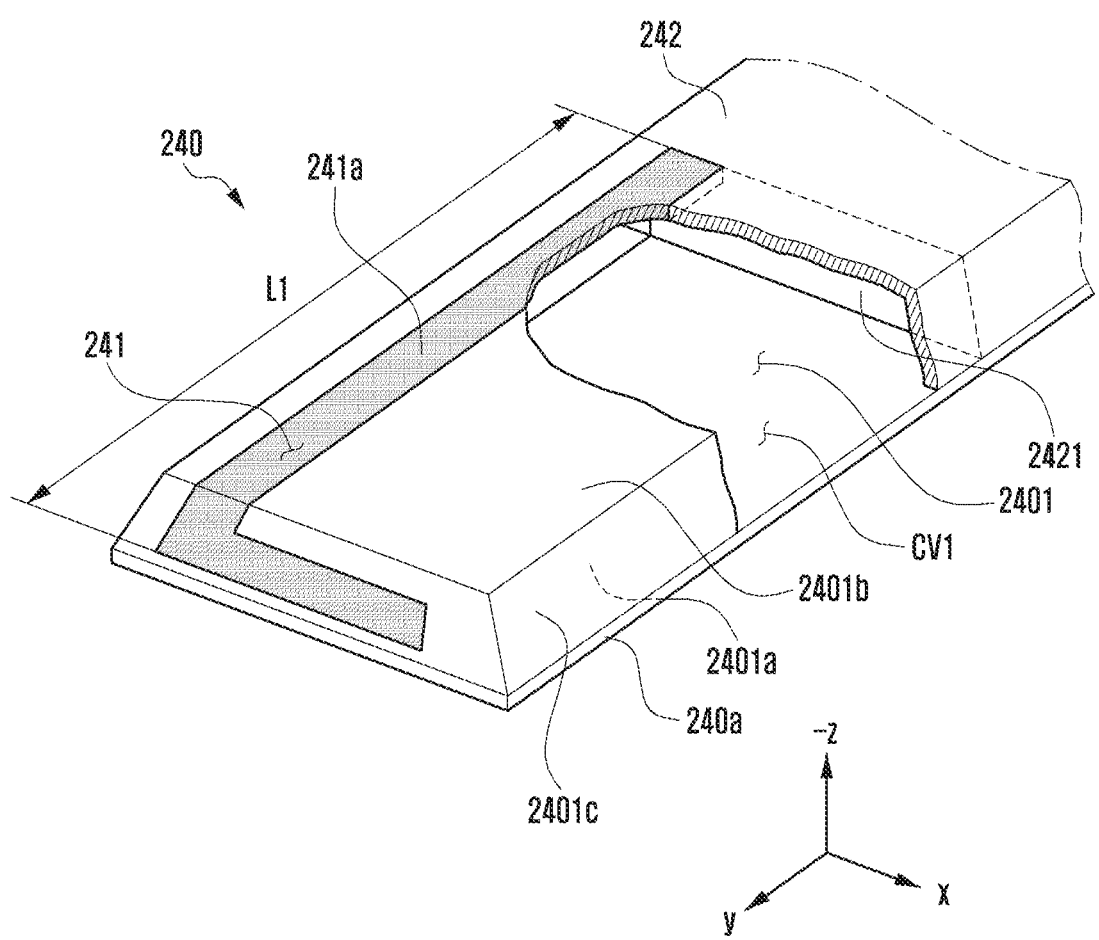
FIG. 6 is a partially cut-away perspective view illustrating a region 6 in FIG. 2B according to an embodiment of the disclosure.

FIG. 6 is a partially cut-away perspective view illustrating a region 6 in FIG. 2B according to an embodiment of the disclosure.

Referring to FIG. 6, the fourth housing 240 may include a first surface 2401a oriented in a first direction (e.g., the z-axis direction), and a second surface 2401b oriented in a direction opposite to the first surface 2401a (e.g., the –z-axis direction), and a side surface 2401c surrounding a fourth space 2401 (e.g., the first cavity CV1) between the first surface 2401a and the second surface 2401b. According to an embodiment of the disclosure, the first surface 2401a may support a portion of the flexible display 201. According to an embodiment of the disclosure, the second surface 2401b may be disposed through the fourth support member 240a. In some embodiments of the disclosure, the second surface 2401b may be provided in a manner of extending from the side surface 2401 without the fourth support member 240a. In some embodiments of the disclosure, the second surface 2401b may be provided through a separate rear cover coupled to the side surface 2401c. According to an embodiment of the disclosure, the fourth housing 240 may include a conductive material 242. According to an embodiment of the disclosure, the fourth housing 240 may include a first cavity CV1 provided to have a predetermined spatial volume through at least a portion of the fourth space 2401. According to an embodiment of the disclosure, the first cavity CV1 may be substantially the same as the fourth space 2401. According to an embodiment of the disclosure, the shape and the spatial volume of the first cavity CV1 may be determined through a wall 2421 extending from the conductive material 242. According to an embodiment of the disclosure, the fourth housing 240 may include a first slit 241 provided to have a first length L1 substantially equal to that of the first cavity CV1 in the longitudinal direction (e.g., the y-axis direction) of the first cavity CV1. According to an embodiment of the disclosure, the first slit 241 may be filled with a non-conductive material 241a. In some embodiments of the disclosure, the first slit 241 may be provided through the non-conductive material 241a injection-molded into the conductive material 242. According to an embodiment of the disclosure, the first slit 241 may be provided in the second surface 2401b. In some embodiments of the disclosure, the first slit 241 may be disposed in a manner of extending to at least a portion of the side surface 2401c from the second surface 2401b.

According to an embodiment of the disclosure, the first cavity CV1 has a feed structure electrically connected to a wireless communication circuit (e.g., the wireless communication module 192 in FIG. 1) in at least a portion of the internal space, and thus, an electric field may be formed near at least a portion of the first slit 241. Thus, the first cavity CV1 may operate as an antenna (e.g., the first antenna A1 in FIG. 5). Although not illustrated, the second cavity (e.g., the second cavity CV2 in FIG. 5) disposed in the first housing (e.g., the first housing 210 in FIG. 5) may also be provided in substantially the same manner.

According to an embodiment of the disclosure, the fourth housing 240, the partition wall, or the fourth support member 240a defining the first cavity CV1 may include a conductive member.

Figure 7A:
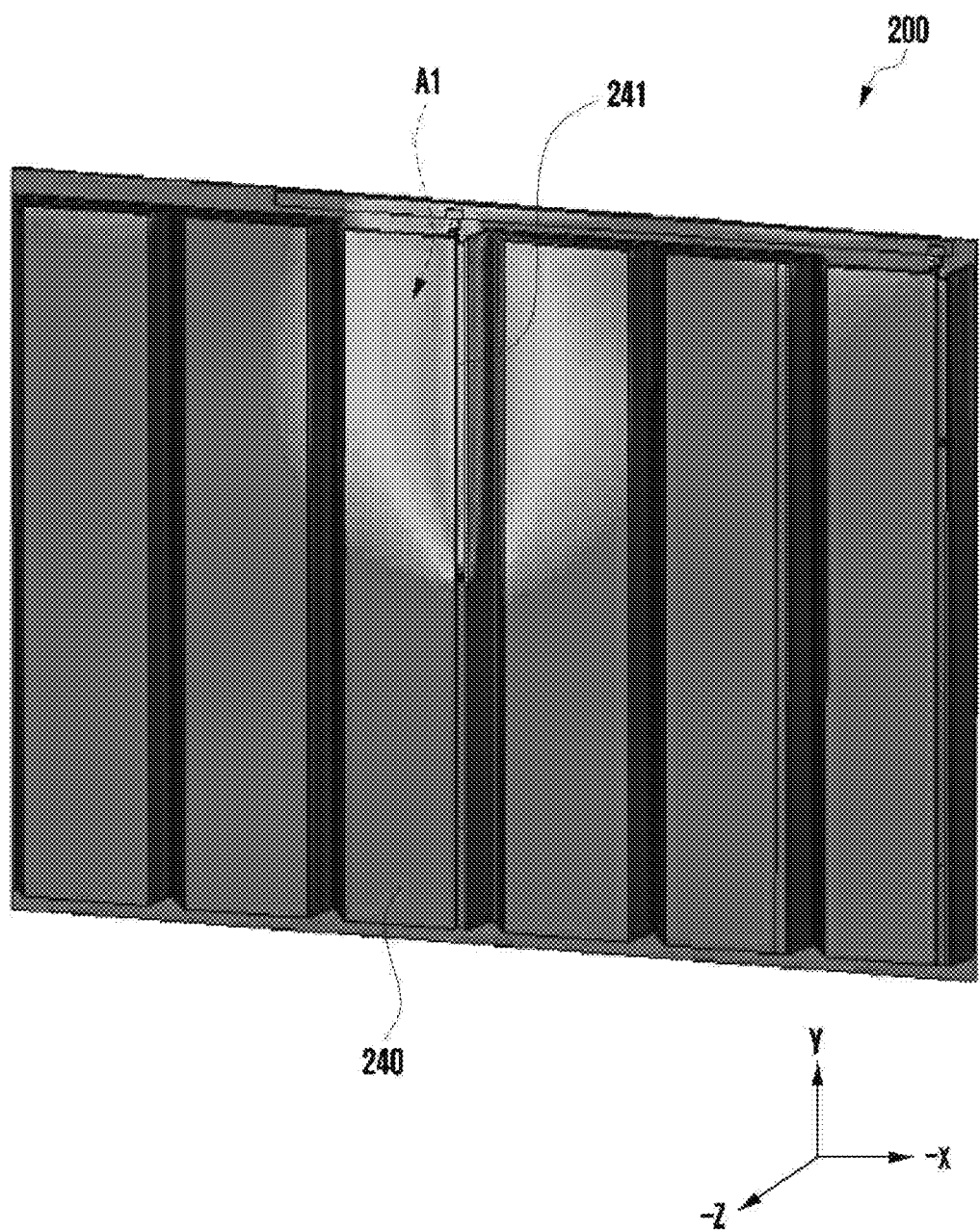
FIGS. 7A and 7B are rear perspective views of an electronic device illustrating a current distribution via a first antenna and a second antenna according to various embodiments of the disclosure.
Figure 7B:
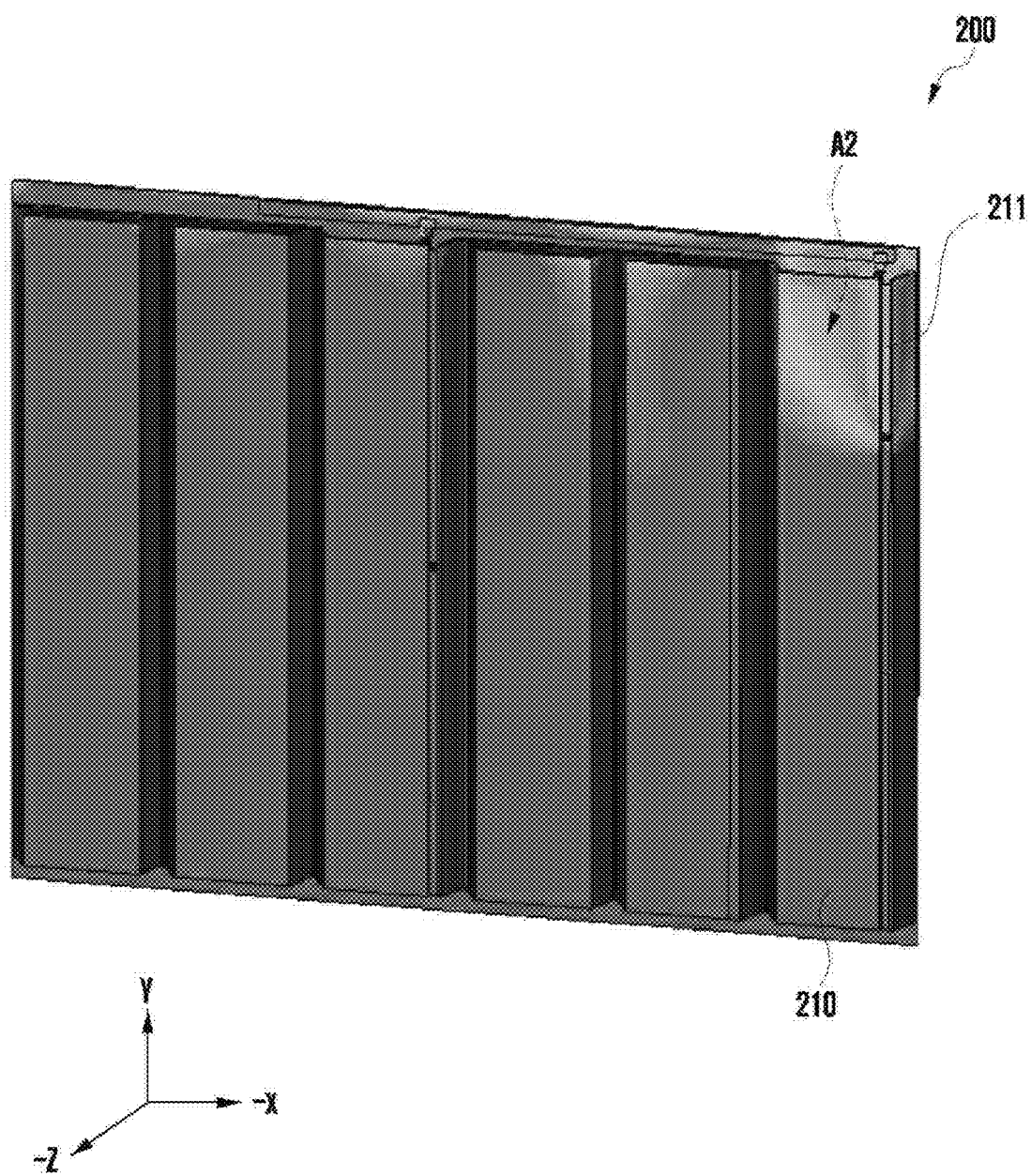

FIGS. 7A and 7B are rear perspective views of an electronic device illustrating a current distribution via a first antenna and a second antenna according to various embodiments of the disclosure.

Referring to FIGS. 7A and 7B, in an embodiment of the disclosure, the electronic device 200 may include a first antenna A1 disposed in the fourth housing 240 and operated by a first cavity structure including the first slit 241 and a second antenna A2 disposed in the first housing 210 and operated by a second cavity structure including the second slit 211. As illustrated in FIG. 7A, it can be seen that the first antenna A1 is able to operate as an antenna since an electric field is formed near the first slit 241 included in the first cavity (e.g., the first cavity CV1 in FIG. 5). As another example, as illustrated in FIG. 7B, it can be seen that the second antenna A2 is able to operate as an antenna since an electric field is formed near the second slit 211 included in the second cavity (e.g., the second cavity CV2 in FIG. 5).

Figure 8A:
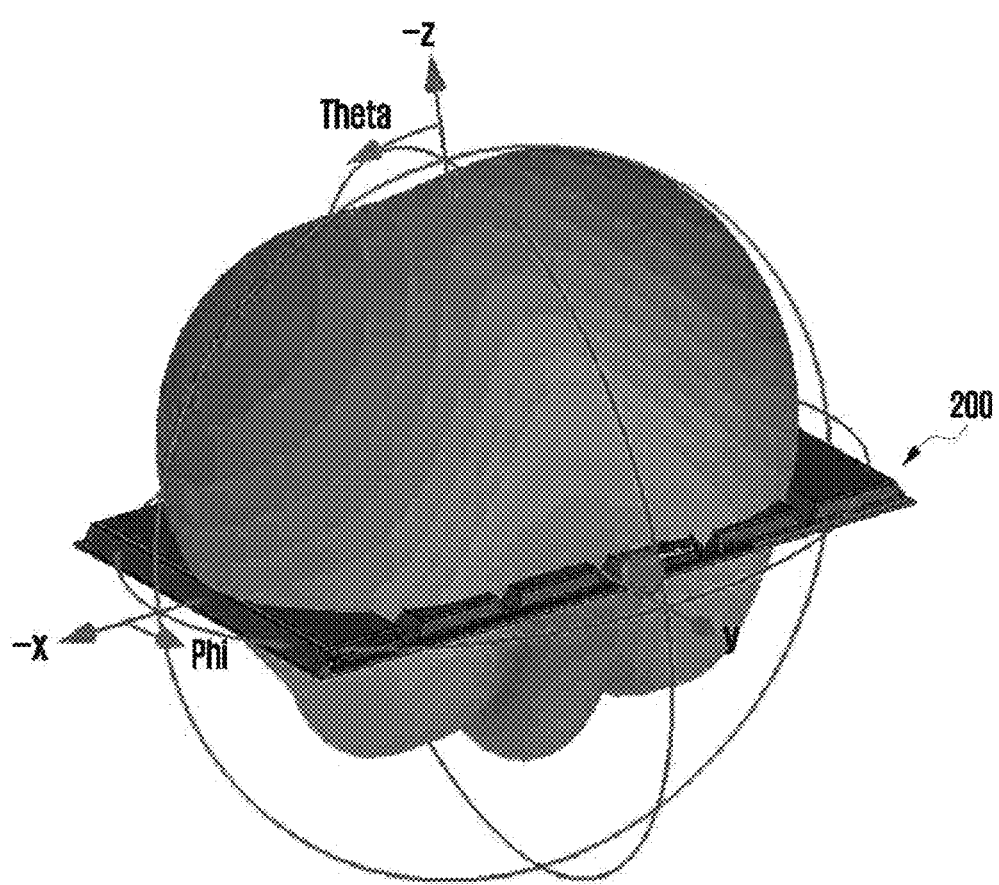
FIGS. 8A and 8B are diagrams illustrating directions of radiation patterns when an electronic device is in a flat state and a rolled state, respectively, according to various embodiments of the disclosure.
Figure 8B:
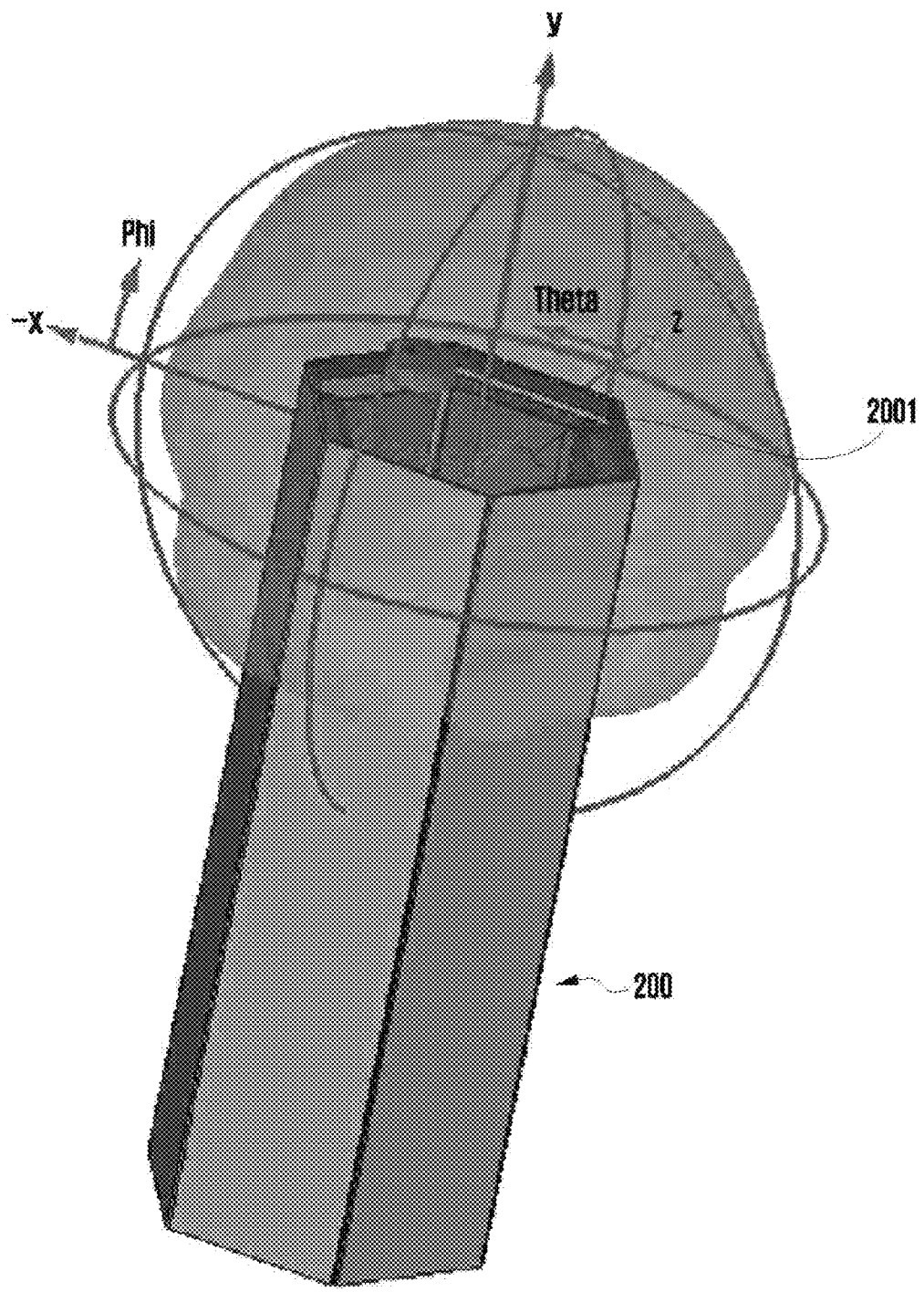

FIGS. 8A and 8B are diagrams illustrating directions of radiation patterns when an electronic device is in a flat state and a rolled state, respectively, according to various embodiments of the disclosure.

Referring to FIG. 8A, it can be seen that, when the electronic device 200 is in the flat state, the radiation pattern is formed in a direction in which the rear surface of the electronic device 200 is oriented (e.g., the –z-axis direction).

Referring to FIG. 8B, it can be seen that, when the electronic device 200 is in the rolled state, the radiation pattern is smoothly formed outward (e.g., in the y-axis direction) from the hollow rolling space 2001 defined through the folding operation of the plurality of housings (e.g., the plurality of housings 210, 220, 230, 240, 250, and 260 in FIG. 5).

Figure 9A:
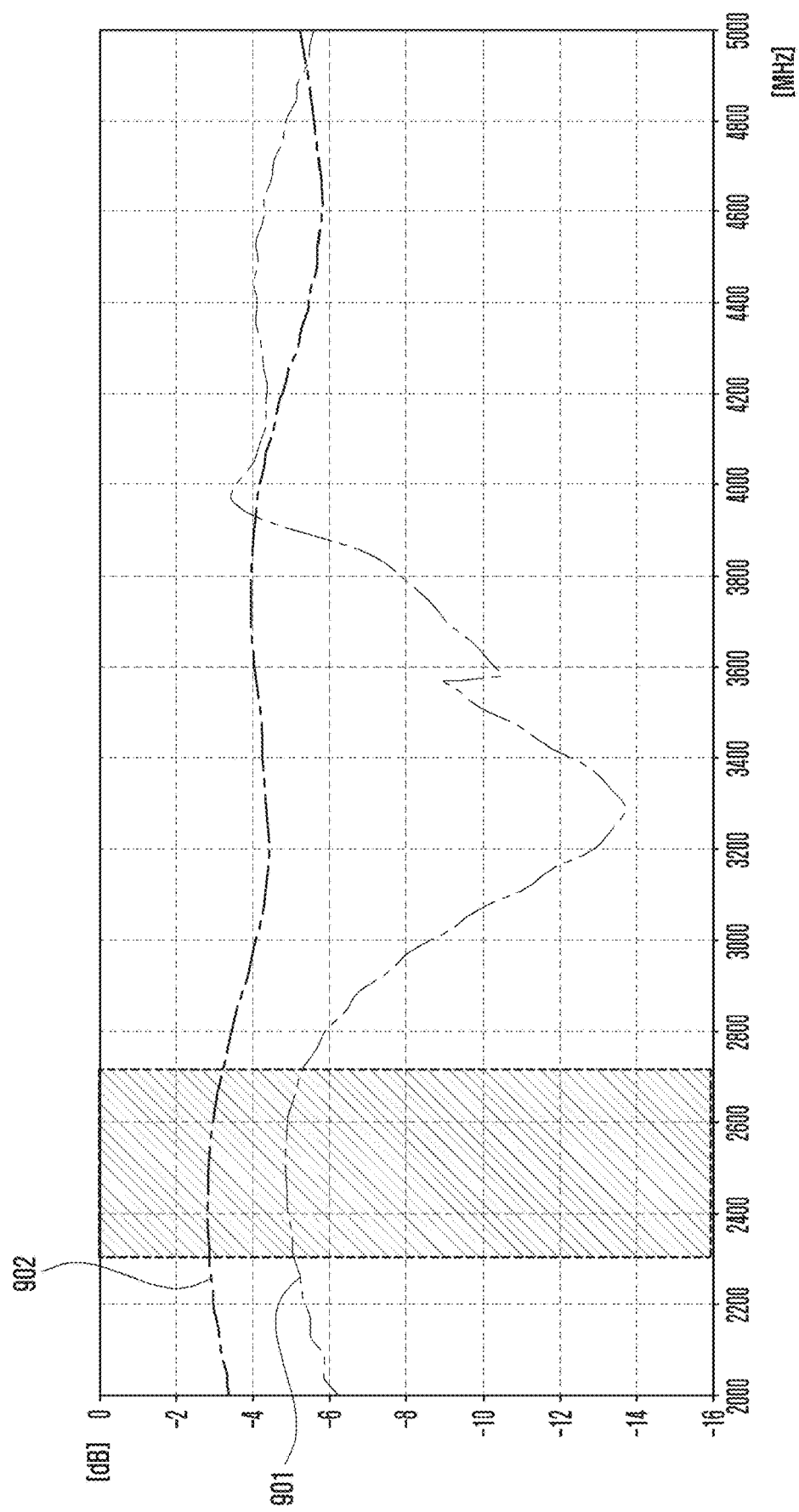
FIG. 9A is a graph comparing a radiation performances of a first antenna in a flat state and a rolled state of an electronic device according to an embodiment of the disclosure.

FIG. 9A is a graph comparing a radiation performances of a first antenna in a flat state and a rolled state of an electronic device according to an embodiment of the disclosure.

Referring to FIG. 9A, a graph (including 901 and 902) obtained by measuring radiation efficiencies in the flat state and the rolled state of the electronic device 200 when the first length L1 of the first slit 241 is about 70 mm in the first antenna A1 of FIG. 2A is illustrated. It can be seen that predetermined radiation performances are exhibited in the flat state and the rolled state by showing a slight gain deviation of about 2 dB in a high frequency band (e.g., about 2300 MHz to 2700 MHz).

Figure 9B:
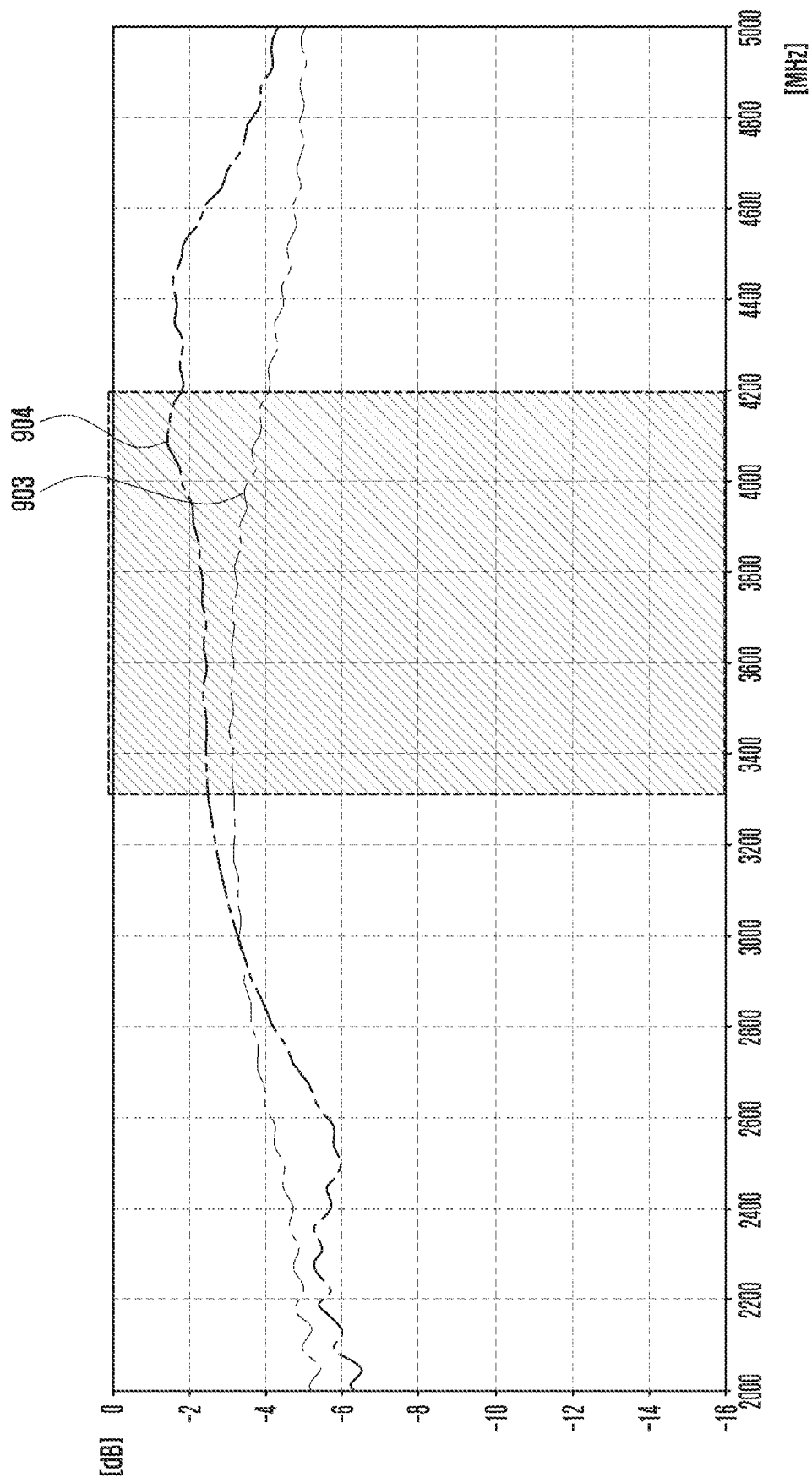
FIG. 9B is a graph comparing a radiation performances of a second antenna in a flat state and a rolled state of an electronic device according to an embodiment of the disclosure.

FIG. 9B is a graph comparing a radiation performances of a second antenna in a flat state and a rolled state of an electronic device according to an embodiment of the disclosure.

Referring to FIG. 9B, is a graph (including 903 and 904) obtained by measuring radiation efficiencies in a flat state and rolled state of the electronic device when the second length L2 of the second slit 211 is about 35 mm in the second antenna A2 of FIG. 2A is illustrated. It can be seen that predetermined radiation performances are exhibited in the flat state and the rolled state by showing a slight gain deviation of about 2 dB in the n77 band (e.g., about 3300 MHz to 4200 MHz).

FIG. 10A is a perspective view of an electronic device illustrating an arrangement structure of slits with respect to cavities according to an embodiment of the disclosure.

In describing the electronic device 200 of FIG. 10A, the same reference numerals are assigned to components substantially the same as those of the electronic device 200 of FIG. 2B, and a detailed description thereof may be omitted.

Referring to FIG. 10A, the electronic device 200 may include a plurality of housings 210, 220, 230, 240, 250, and 260 foldably coupled to each other via hinge devices h and a flexible display (e.g., the flexible display 201 in FIG. 2A) disposed to be supported by the plurality of housings 210, 220, 230, 240, 250, and 260. According to an embodiment of the disclosure, the electronic device 200 may include a first cavity CV1 provided through a structural shape of the fourth housing 240 made of a conductive material (e.g., the conductive material 242 in FIG. 6), and having the first length L1. According to an embodiment of the disclosure, the fourth housing 240 may include a first slit 241 disposed at a position at which the first slit 241 partially corresponds to the first cavity CV1 and having a third length L3 shorter than the first length L1. According to an embodiment of the disclosure, the electronic device 200 may include a first antenna A1 configured to operate in a predetermined frequency band through the first cavity CV1 and the first slit 241.

Figure 10B:
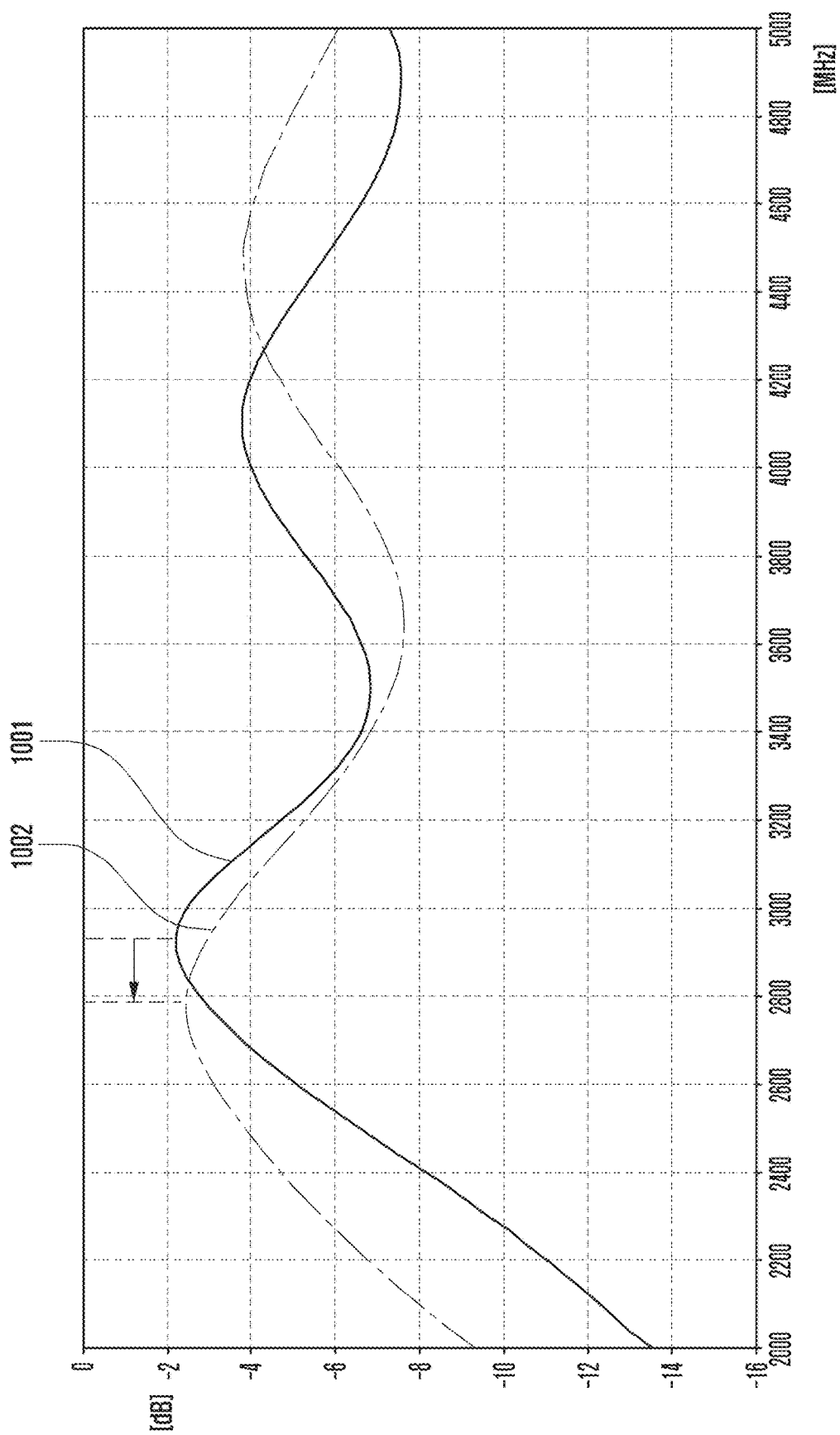
FIG. 10B is a graph comparing operating frequency bands of a first antenna according to a change in a length of a slit according to an embodiment of the disclosure.

FIG. 10B is a graph comparing operating frequency bands of a first antenna according to a change in a length of a slit according to an embodiment of the disclosure.

Referring to FIG. 10B, in the electronic device 200 of FIG. 10A, it can be seen that an operating frequency band (graph 1001) formed through the first slit 241 having the third length L2 (e.g., about 55 mm) shorter than the first length L1 (e.g., about 70 mm) of the first cavity CV1 is relatively higher than the operating frequency band (graph 1002) of the first antenna formed through the first slit 241 having a length substantially the same as the first length L1 of the first cavity CV1. For example, when the first slit 241 has a length closer to the first length L1 of the first cavity CV1, it may mean that the operating frequency band of the first antenna A1 is shifted to a lower frequency band. For example, this may be advantageous in determining the operating frequency band of the first antenna A1 by changing the length L3 of the first slit 241 after the first cavity CV1 is provided.

Figure 11:
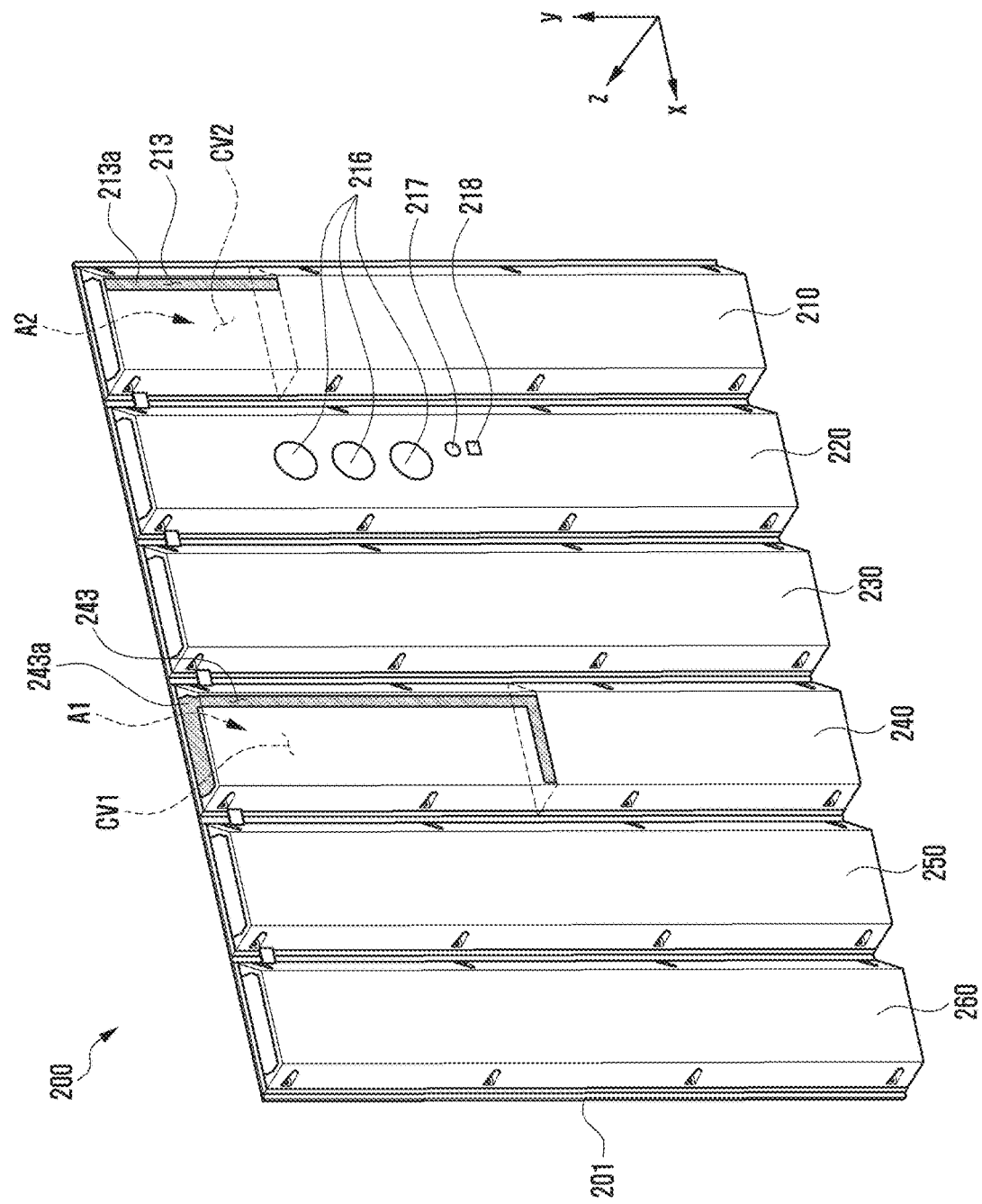
FIGS. 11 and 12 are rear perspective views of an electronic device including at least one antenna according to various embodiments of the disclosure.
Figure 12:
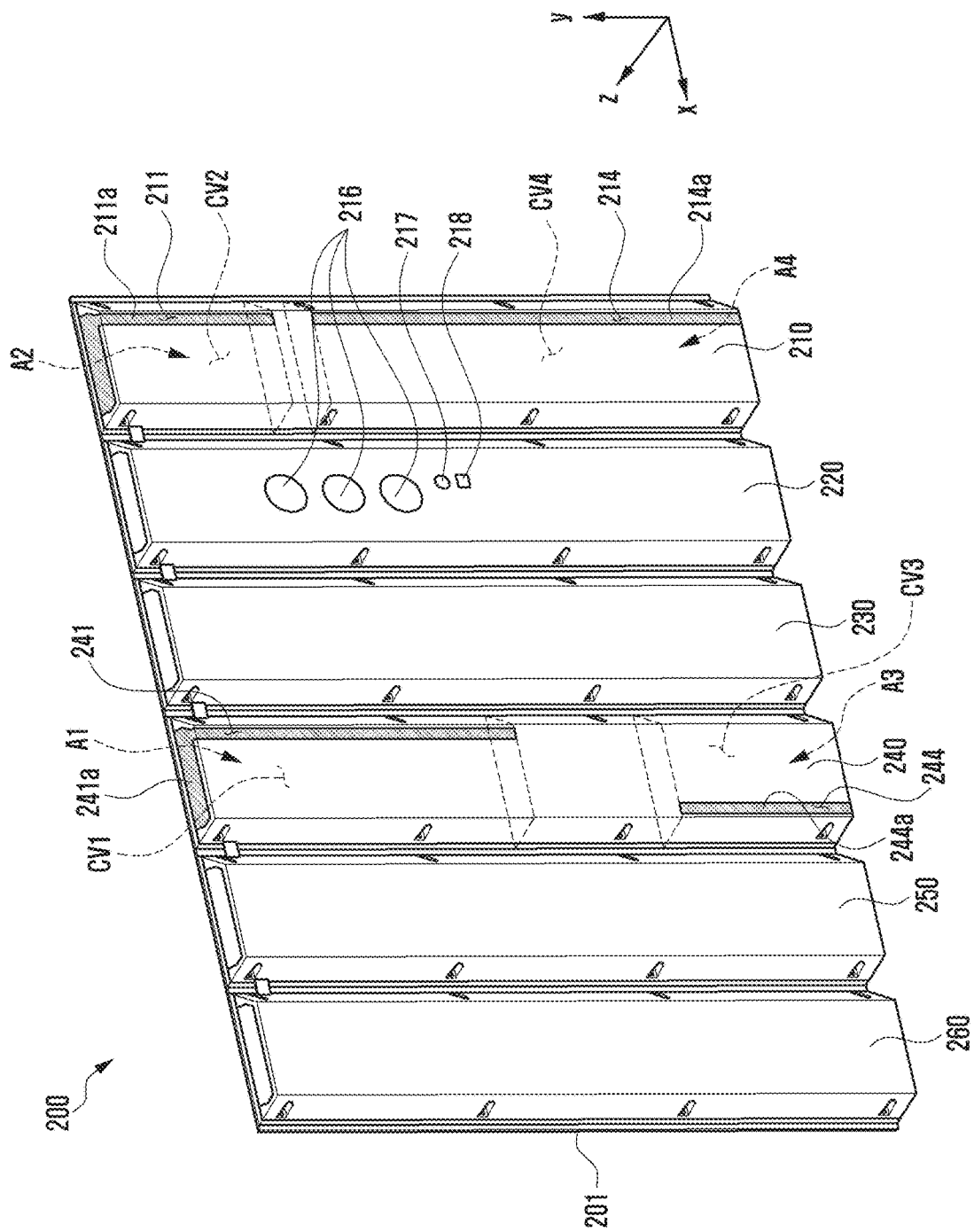

FIGS. 11 and 12 are rear perspective views of an electronic device including at least one antenna according to various embodiments of the disclosure.

In describing the electronic device 200 of FIGS. 11 and 12, the same reference numerals are assigned to components substantially the same as those of the electronic device 200 of FIG. 2B, and a detailed description thereof may be omitted.

Referring to FIG. 11, the electronic device 200 may include a plurality of housings 210, 220, 230, 240, 250, and 260 foldably coupled to each other via hinge devices h and a flexible display (e.g., the flexible display 201 in FIG. 2A) disposed to be supported by the plurality of housings 210, 220, 230, 240, 250, and 260. According to an embodiment of the disclosure, the electronic device 200 may include a first cavity CV1 provided through a structural change of the fourth housing 240 including a conductive material and a first antenna A1 configured to operate in a predetermined first frequency band through the first slit 243 disposed at a position at which the first slit 243 partially corresponds to the first cavity CV1. According to an embodiment of the disclosure, the electronic device 200 may include a second cavity CV2 provided through a structural change of the first housing 210 including a conductive material and a second antenna A2 configured to operate in a predetermined second frequency band through the second slit 213 disposed at a position at which the second slit 243 partially corresponds to the second cavity CV2. According to an embodiment of the disclosure, the first slit 243 and the second slit 213 may be filled through non-conductive materials 243a and 213a, respectively. According to an embodiment of the disclosure, the first slit 243 may be provided in a " ㄷ " shape in the fourth housing 240. According to an embodiment of the disclosure, the second slit 213 may be provided in a "I" shape in the first housing 210. Although not illustrated, the shapes of the first slit 243 and the second slit 213 may be provided in various ways depending on the shapes of the first cavity CV1 and the second cavity CV2 and the operating frequency band.

Referring to FIG. 12, the electronic device 200 may include a first cavity CV1 provided through a structural change in the upper region of the fourth housing 240 and a first antenna A1 configured to operate in a predetermined first frequency band through the first slit 241 disposed at a position at which the first slit 241 partially corresponds to the first cavity CV1. According to an embodiment of the disclosure, the electronic device 200 may include a second cavity CV2 provided through a structural change in the upper region of the first housing 210 and a second antenna A2 configured to operate in a predetermined second frequency band through the second slit 211 disposed at a position at which the second slit 211 partially corresponds to the second cavity CV2. According to an embodiment of the disclosure, the electronic device 200 may include a third cavity CV3 provided through a structural change in the lower region of the fourth housing 240 (e.g., the −y-axis direction region) and a third antenna A3 configured to operate in a predetermined third frequency band through the third slit 244 disposed at a position at which the third slit 244 partially corresponds to the third cavity CV3. According to an embodiment of the disclosure, the electronic device 200 may include a fourth cavity CV4 provided through a structural change in the lower region of the first housing 210 (e.g., the −y-axis direction region) and a fourth antenna A4 configured to operate in a predetermined fourth frequency band through the fourth slit 214 disposed at a position at which the fourth slit 214 partially corresponds to the fourth cavity CV4. According to an embodiment of the disclosure, the first slit 241, the second slit 211, the third slit 244 and/or the fourth slit 241 may be filled with non-conductive materials 241a, 211a, 244a, and 241a, respectively. According to an embodiment of the disclosure, the first to fourth frequency bands may be the same as or different from each other.

The antennas A1, A2, A3, and A4 having a cavity structure according to various embodiments of the disclosure may have operating frequency bands, which are determined depending on the shapes of the cavities CV1, CV2, CV3, and CV4 and/or the shapes of the slits 241, 211, 244, and 214, respectively. According to an embodiment of the disclosure, even when peripheral conductive structures (e.g., other conductive housings) are disposed close thereto, the antennas A1, A2, A3, and A4 having a cavity structure may be helpful in reducing degradation in radiation performance since a radiation pattern is formed through a resonance characteristic of the cavity structure when the electronic device 200 is in the rolled state.

According to various embodiments of the disclosure, an electronic device (e.g., the electronic device 200 in FIG. 5) may include at least one hinge device (e.g., the hinge device h in FIG. 2B), a plurality of housings (e.g., the plurality of housings 210, 220, 230, 240, 250, and 260 in FIG. 5) foldably connected to each other through the at least one hinge device and configured to at least partially define a rolling space (e.g., the hollow rolling space 2001 in FIG. 3A) in a rolled state, a flexible display (e.g., the flexible display 201 in FIG. 5) supported by the plurality of housings and disposed to be visible from the outside in the rolled state, a cavity (e.g., the first cavity CV1 in FIG. 5) formed in a first housing (e.g., the fourth housing 240 in FIG. 5) among the plurality of housings through a conductive material (e.g., the conductive material 242 in FIG. 6) to have a predetermined spatial volume, wherein the cavity includes a slit (e.g., the first slit 241 in FIG. 5) at least partially connected to the outside, and a wireless communication circuit (e.g., the wireless communication module 192 in FIG. 1) disposed in an inner space of at least one housing (e.g., the second housing 220 or the third housing 230 in FIG. 5) among the plurality of housings and electrically connected to a first point in the cavity, wherein the wireless communication circuit may be configured to form a radiation pattern through the cavity structure.

According to various embodiments of the disclosure, the at least one frequency band may be determined depending on the size of the spatial volume.

According to various embodiments of the disclosure, the at least one frequency band may be determined depending on the shape of the slit.

According to various embodiments of the disclosure, the first housing may include a first surface configured to support a portion of the flexible display, a second surface facing away from the first surface, and a side surface surrounding an inner space between the first surface and the second surface, and the cavity may be formed through the first surface, the second surface, and the side surface.

According to various embodiments of the disclosure, the spatial volume of the cavity may be determined via the conductive material at least partially filled in the inner space.

According to various embodiments of the disclosure, the second surface and the side surface may be integrated with each other.

According to various embodiments of the disclosure, the cavity may be formed through a conductive support member coupled to the side surface and configured to support a portion of the flexible display.

According to various embodiments of the disclosure, the slit may be disposed in at least a portion of the second surface or the side surface.

According to various embodiments of the disclosure, the slit may extend from at least a portion of the second surface to at least a portion of the side surface.

According to various embodiments of the disclosure, the slit may include a non-conductive material injection-molded into the conductive material.

According to various embodiments of the disclosure, the wireless communication circuit may be disposed within the cavity.

According to various embodiments of the disclosure, the electronic device may include a substrate disposed to include the wireless communication circuit in an inner space of a second housing different from the first housing among the plurality of housings, and the substrate and the first point in the cavity may be electrically connected to each other via an electrical connection member.

According to various embodiments of the disclosure, the electrical connection member may include a flexible FPCB or coaxial cable.

According to various embodiments of the disclosure, the electronic device may further include at least one electronic component disposed in an inner space of at least one housing different from the first housing and/or the second housing among the plurality of housings, wherein the at least one electronic component may be electrically connected to the substrate via the electrical connection member.

According to various embodiments of the disclosure, the at least one electronic component may include at least one of at least one camera module, at least one battery, a speaker module, a microphone module, and at least one sensor module.

According to various embodiments of the disclosure, the wireless communication circuit may be configured to form a radiation pattern in a direction opposite to a direction in which the flexible display is oriented when the electronic device is in a flat state.

According to various embodiments of the disclosure, the at least one frequency band may include a range of 800 MHz to 6,000 MHz.

According to various embodiments of the disclosure, the rolling space may be defined to open in a direction perpendicular to the direction in which the flexible display is oriented.

According to various embodiments of the disclosure, the rolling space may be sealed by the plurality of housings, except for a portion opened in the perpendicular direction.

According to various embodiments of the disclosure, at least one housing adjacent to the first housing among the plurality of housings may be made of the conductive material.

According to various embodiments of the disclosure, the cavity may be provided through a structural change of a third housing including the conductive material and an antenna configured to operate in a predetermined first frequency band through the slit disposed at a position at which the slit partially corresponds to the cavity.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
    at least one hinge device;
    a plurality of housings that are foldably connected to each other via the at least one hinge device and configured to at least partially define a rolling space in a rolled state;
    a flexible display supported by the plurality of housings and disposed to be visible from outside in the rolled state;
    a cavity defined to have a predetermined spatial volume in a first housing among the plurality of housings, the cavity being sealed by the first housing and including a slit that is at least partially connected to the outside; and
    a wireless communication circuit disposed in an inner space of at least one housing among the plurality of housings and electrically connected to a first point within the cavity,
    wherein the wireless communication circuit is configured to form a radiation pattern through a cavity structure,
    wherein the first housing is made of a conductive material, the first housing including a first surface supporting a portion of the flexible display, a second surface facing away from the first surface, and a side surface surrounding a space between the first surface and the second surface,
    wherein the cavity is formed through the first surface, the second surface, and the side surface,
    wherein the slit is disposed on the second surface and the side surface at a position corresponding to at least a portion of the cavity,
    wherein the slit is formed in an L-shape in which a first portion of the slit extends in a first direction on the second surface and a second portion of the slit extends in a second direction perpendicular to the first direction on the side surface,
    wherein the first portion of slit extending in the first direction on the second surface extends into the side surface in the first direction to connect with the second portion of the slit extending in the second direction on the side surface, and
    wherein the slit changes direction from extending in the first direction to extending in the second direction on the side surface.

2. The electronic device of claim 1, wherein at least one frequency band is determined based on a size of the predetermined spatial volume.

3. The electronic device of claim 1, wherein at least one frequency band is determined based on a shape of the slit.

4. The electronic device of claim 1, wherein the predetermined spatial volume of the cavity is determined via the conductive material at least partially filled in the inner space.

5. The electronic device of claim 4, wherein the second surface and the side surface are integrated with each other.

6. The electronic device of claim 5, wherein the cavity is formed through a conductive support member coupled to the side surface and configured to support a portion of the flexible display.

7. The electronic device of claim 1, wherein the slit is disposed in at least a portion of the second surface or the side surface.

8. The electronic device of claim 1, wherein the slit extends from at least a portion of the second surface to at least a portion of the side surface.

9. The electronic device of claim 1, wherein the slit includes a non-conductive material injection-molded into the conductive material.

10. The electronic device of claim 1, wherein the wireless communication circuit is disposed within the cavity.

11. The electronic device of claim 1, further comprising:
    a substrate disposed to include the wireless communication circuit in an inner space of a second housing different from the first housing among the plurality of housings,
    wherein the substrate and the first point within the cavity are electrically connected via an electrical connection member.

12. The electronic device of claim 11, wherein the electrical connection member includes a flexible printed circuit board (FPCB) or coaxial cable.

13. The electronic device of claim 11, further comprising:
    at least one electronic component disposed in an inner space of at least one housing different from at least one of the first housing or the second housing among the plurality of housings,
    wherein the at least one electronic component is electrically connected to the substrate via the electrical connection member.

14. The electronic device of claim 13, wherein the at least one electronic component includes at least one of at least one camera, at least one battery, a speaker, a microphone, or at least one sensor.

15. The electronic device of claim 11, further comprising:
    a second cavity defined to have a second predetermined spatial volume through a conductive material in one housing among the plurality of housings and different from the first housing,
    wherein the first point within the cavity and a second point within the second cavity are electrically connected to the substrate including the wireless communication circuit via the electrical connection member.

16. The electronic device of claim 1, wherein the wireless communication circuit is configured to, while the electronic device is in a flat state, form the radiation pattern in a direction opposite to a direction in which the flexible display is oriented.

17. The electronic device of claim 1, further comprising:
    at least one antenna,
    wherein the at least one antenna is configured to at least one of transmit or receive a radio signal in at least one frequency band via the wireless communication circuit, and
    wherein the at least one frequency band includes a range of 800 megahertz (MHz) to 6,000 MHz.

18. The electronic device of claim 1, wherein the rolling space is defined to open in a direction perpendicular to a direction in which the flexible display is oriented.

19. The electronic device of claim 18, wherein the rolling space is sealed by the plurality of housings, except for a portion opened in the direction perpendicular to the direction in which the flexible display is oriented.

20. The electronic device of claim 1, wherein at least one housing adjacent to the first housing among the plurality of housings is made of the conductive material.

* * * * *